(12) United States Patent
Ogawa et al.

(10) Patent No.: US 10,000,118 B2
(45) Date of Patent: Jun. 19, 2018

(54) CLUTCH CONTROL DEVICE FOR FOUR-WHEEL-DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 10 days.

(21) Appl. No.: 15/302,879

(22) PCT Filed: Mar. 30, 2015

(86) PCT No.: PCT/JP2015/059976
§ 371 (c)(1),
(2) Date: Oct. 7, 2016

(87) PCT Pub. No.: WO2015/156161
PCT Pub. Date: Oct. 15, 2015

(65) Prior Publication Data
US 2017/0028843 A1  Feb. 2, 2017

(30) Foreign Application Priority Data

Apr. 11, 2014 (JP) ................................ 2014-082036

(51) Int. Cl.
*B60K 17/02* (2006.01)
*F16D 13/74* (2006.01)
(Continued)

(52) U.S. Cl.
CPC ............ *B60K 17/02* (2013.01); *B60K 17/344* (2013.01); *B60K 17/35* (2013.01); *B60K 23/08* (2013.01);
(Continued)

(58) Field of Classification Search
CPC ...... B60K 17/02; B60K 17/35; B60K 17/344; B60K 17/3515; B60K 23/08;
(Continued)

(56) References Cited

U.S. PATENT DOCUMENTS 4,781,266 A * 11/1988 Hotta ................... B60K 17/344
                                                   180/197
8,825,324 B2 * 9/2014 Horaguchi ........... B60K 17/344
                                                    701/53
(Continued)

FOREIGN PATENT DOCUMENTS

JP  62-178436 A   8/1987
JP  2010-96254 A  4/2010
(Continued)

*Primary Examiner* — Ramya P Burgess
*Assistant Examiner* — David R Morris
(74) *Attorney, Agent, or Firm* — Global IP Counselors, LLP

(57) ABSTRACT

A vehicle clutch control device is provided for switching from a two-wheel drive traveling to a four-wheel drive traveling. The vehicle clutch control device includes a dog clutch that separates a rear wheel drive from a front wheel drive by releasing the dog clutch, an electronically controlled coupling that distributes a driving force of a transverse engine to left and right rear wheels in accordance with a clutch connection capacity, and a four-wheel drive control unit. The four-wheel drive control unit switches the drive mode to one of a disconnect two-wheel drive mode in which the dog clutch and the electronically controlled coupling are released, a connect four-wheel drive mode in which the dog clutch and the electronically controlled coupling are (Continued)

engaged, and a stand-by two-wheel drive mode in which the dog clutch is engaged while the electronically controlled coupling is released.

19 Claims, 10 Drawing Sheets

(51) Int. Cl.
*B60K 17/344* (2006.01)
*B60K 23/08* (2006.01)
*F16D 11/00* (2006.01)
*F16D 25/0638* (2006.01)
*F16D 21/00* (2006.01)
*F16D 48/06* (2006.01)
*B60K 17/35* (2006.01)

(52) U.S. Cl.
CPC ............ *F16D 11/00* (2013.01); *F16D 13/74* (2013.01); *F16D 21/00* (2013.01); *F16D 25/0638* (2013.01); *F16D 48/06* (2013.01); *B60K 17/3515* (2013.01); *B60K 23/0808* (2013.01); *B60K 2023/0858* (2013.01); *B60Y 2300/427* (2013.01); *B60Y 2300/52* (2013.01); *B60Y 2400/421* (2013.01); *B60Y 2400/424* (2013.01); *B60Y 2400/4244* (2013.01); *F16D 2500/10431* (2013.01); *F16D 2500/30806* (2013.01); *F16D 2500/3108* (2013.01); *F16D 2500/3115* (2013.01); *F16D 2500/3144* (2013.01); *F16D 2500/31426* (2013.01)

(58) Field of Classification Search
CPC ........ B60K 23/0808; B60K 2023/0858; F16D 21/00; F16D 13/74; F16D 48/06; F16D 11/00; F16D 25/0638; F16D 2500/3108; F16D 2500/10431; F16D 2500/30806; F16D 2500/3144; F16D 2500/31426; F16D 2500/3115; B60Y 2400/424; B60Y 2400/421; B60Y 2400/4244; B60Y 2300/427; B60Y 2300/52

See application file for complete search history.

(56) References Cited

U.S. PATENT DOCUMENTS

| | | | |
|---|---|---|---|
| 9,243,673 B2* | 1/2016 | Kodama | F16D 23/12 |
| 9,272,619 B2* | 3/2016 | Quehenberger | B60K 17/35 |
| 9,688,141 B2* | 6/2017 | Takaishi | F16D 48/066 |
| 9,688,142 B2* | 6/2017 | Ogawa | B60K 23/08 |
| 9,758,037 B2* | 9/2017 | Horiike | B60K 17/3515 |
| 9,758,038 B2* | 9/2017 | Ogawa | B60K 23/08 |
| 9,783,053 B2* | 10/2017 | Ogawa | B60K 23/08 |
| 2010/0094519 A1* | 4/2010 | Quehenberger | B60K 17/35 701/69 |
| 2013/0226421 A1* | 8/2013 | Horaguchi | B60K 17/344 701/67 |
| 2014/0163831 A1* | 6/2014 | Kodama | F16D 23/12 701/68 |
| 2016/0193917 A1* | 7/2016 | Horiike | B60K 17/3515 701/54 |
| 2016/0297300 A1* | 10/2016 | Tamura | B60K 23/0808 |
| 2016/0347171 A1* | 12/2016 | Ogawa | B60W 40/114 |
| 2016/0355086 A1* | 12/2016 | Ogawa | B60K 17/344 |
| 2016/0355089 A1* | 12/2016 | Ogawa | B60K 23/08 |
| 2017/0008396 A1* | 1/2017 | Takaishi | F16D 48/066 |
| 2017/0166052 A1* | 6/2017 | Ogawa | B60K 23/08 |
| 2017/0166053 A1* | 6/2017 | Ogawa | B60K 23/0808 |
| 2017/0182887 A1* | 6/2017 | Ogawa | B60K 23/08 |

FOREIGN PATENT DOCUMENTS

| | | |
|---|---|---|
| JP | 2010-254058 A | 11/2010 |
| JP | 2012-61923 A | 3/2012 |

* cited by examiner

CLUTCH CONTROL DEVICE FOR FOUR-WHEEL-DRIVE VEHICLE

CROSS-REFERENCE TO RELATED APPLICATIONS

This application is a U.S. National stage application of International Application No. PCT/JP2015/059976, filed Mar. 30, 2015, which claims priority to JP Patent Application No. 2014-082036 filed on Apr. 11 2014, the contents of which are hereby incorporated herein by reference.

BACKGROUND

Field of the Invention

The present invention generally relates to a clutch control device for a four-wheel drive vehicle equipped with a meshing clutch and a friction clutch in a driving force transmission system to an auxiliary drive wheel.

Background Information

Conventionally, a four-wheel drive vehicle of a front wheel drive base is known which is provided with a positive or meshing clutch and a friction clutch in a driving force transmission system (for example, refer to Japanese Laid Open Patent Application No. 2010-254058). In this four-wheel drive vehicle, the meshing clutch and the friction clutch are connected at the time of the 4-wheel drive, while the meshing clutch and the friction clutch are released at the time of the 2-wheel drive. Further, at the time of switching from a 2-wheel drive traveling to a four-wheel drive traveling, after the friction clutch is connected, the meshing clutch will be connected.

SUMMARY

In the conventional system, when switching from the 2-wheel drive traveling to four-wheel drive traveling, the meshing clutch is held with a rotational difference in a meshing Stand-by state until the rotational difference disappears. Upon disappearance of the rotational difference, meshing members are pushed together for connection. Therefore, since switching from 2-wheel drive to the four-wheel drive traveling requires a meshing latency or delay, it is difficult to switch the traveling state promptly.

The present invention has been made in view of the above problems, and aims to provide a clutch control device for a four-wheel drive vehicle in which switching from 2-wheel drive to four-wheel drive can be performed promptly.

In order to achieve the above object, a clutch control device for a four-wheel drive vehicle according to the present invention includes a drive mode switching unit which is mounted on a four wheel drive vehicle in which, one of left and right front wheels and left and right rear wheels are set as main drive wheels that are connected to a driving source, while the others are set as auxiliary drive wheels that are connected to the driving source via a clutch. The drive mode switching unit is configured to perform selective control of connecting/releasing of the clutch as well as a switching control of a drive mode of the four-wheel drive vehicle in accordance with a vehicle state. Further, the clutch includes a meshing clutch and a friction clutch, in the driving force transmission system to the auxiliary drive wheels, disposed separately from each other and respectively arranged in a transmission path, with respect to a differential interposed, on a drive branch side on the one hand and in a transmission path of the auxiliary drive wheels on the other. Here, the meshing clutch is operable by releasing the meshing clutch to separate the driving force transmission system to the auxiliary drive wheels from the driving force transmission system to the main drive wheels. The friction clutch may allocate or distribute part of the driving force from the driving source to the auxiliary drive wheels in accordance with the clutch connecting capacity. In addition, the drive mode switching unit switches in one of modes, i.e., a disconnect two-wheel drive mode with the meshing clutch and the friction clutch released, a connect four-wheel drive mode with the meshing clutch and the friction clutch connected, and a stand-by two-wheel drive mode with the meshing clutch connected while the friction clutch released.

Therefore, in the clutch control device for a four-wheel drive vehicle according to the present invention, the drive mode of the four-wheel drive vehicle is switched by the drive mode switching unit in one of the disconnect two-wheel drive mode, the connect four-wheel drive mode, and the stand-by two-wheel drive mode. Here, when switching from the stand-by two-wheel drive mode to the connect four-wheel drive mode, since the meshing clutch is already connected, there is no need to newly connect the meshing clutch at mode switching. In other words, when only the friction clutch is connected, the two-wheel drive traveling may be switched to the four-wheel drive traveling. Thus, the meshing waiting time for meshing the clutch can be eliminated. Therefore, it is possible to switch from the two-wheel drive traveling to the four-wheel drive traveling as soon as possible.

DETAILED DESCRIPTION OF THE EMBODIMENTS

Figure 1:
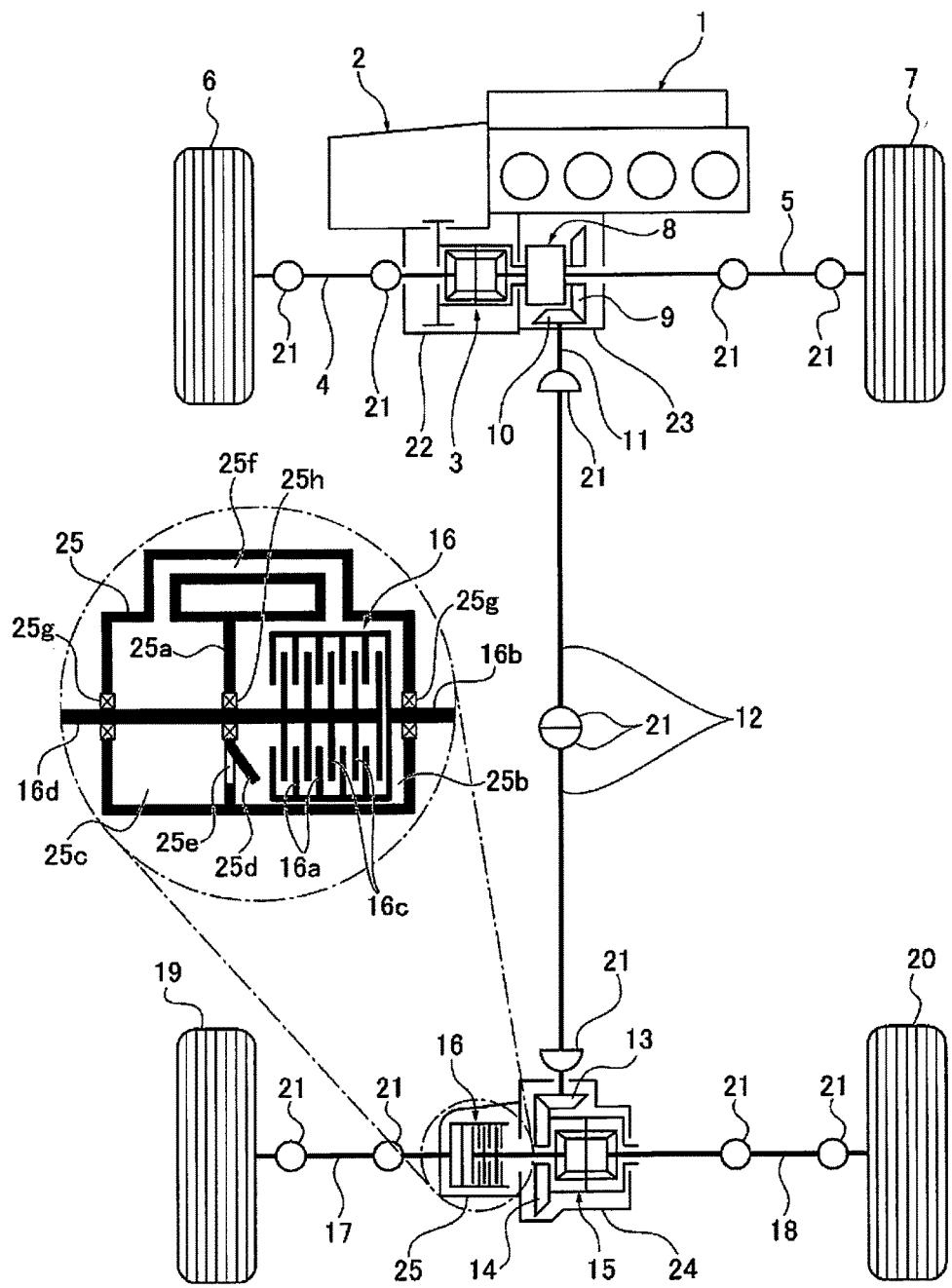
FIG. 1 is a schematic diagram of a driving system of a four-wheel drive vehicle of a front wheel drive base to which a clutch control device is applied in accordance with a first embodiment.

Below, a description is given of the embodiments of the clutch control device for a four-wheel drive vehicle according to the present invention with reference to the first embodiment and the second embodiment shown in the drawings.

First Embodiment

The clutch control device for a four-wheel drive vehicle of a front wheel drive base (an example of a four-wheel drive vehicle) in accordance with a first embodiment will be described separately in the following sections—"drive system for a four-wheel drive vehicle", "control system for a four-wheel drive vehicle", "drive mode switching", and "drive mode switching process".

Drive System for a Four-Wheel Drive Vehicle

FIG. 1 schematically illustrates a drive system for a front wheel drive-based four-wheel drive vehicle to which a clutch control device is applied. Below, with reference to FIG. 1, description is given of the drive system configuration of a four-wheel drive vehicle.

The front wheel drive system for the four-wheel drive vehicle includes, as shown in FIG. 1, a transverse engine 1 (driving source), a transmission 2, a front differential 3, a left front wheel drive shaft 4, a right front wheel drive shaft 5, a left front wheel 6 (main drive wheel), and a right front wheel 7 (main drive wheel). In other words, the driving force passing through the engine 1 and the transmission 2 is transmitted to the left and right front wheel drive shafts 4 and 5 through the front differential 3 to drive the left and right front wheels 6 and 7 at all times while allowing a rotational difference.

The rear wheel drive system of the four-wheel drive vehicle includes, as shown in FIG. 1, a dog clutch 8 (meshing or claw clutch), a bevel gear 9, an output pinion 10, a rear wheel output shaft 11, a propeller shaft 12, a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). Note that a universal joint is denoted by reference numeral 21. That is, in the rear wheel drive system of the four-wheel drive vehicle, by performing the connecting/releasing control of the dog clutch 8 and the electronically controlled coupling 16, such a driving system configuration is available in which the two-wheel drive traveling with both the dog clutch 9 and the electronically controlled coupling 16 released to thereby separate the left and right rear wheels 19 and 20 as auxiliary drive wheels from the transverse engine 1 (=disconnect two-wheel drive mode), and a four-wheel drive traveling with both the dog clutch 8 and the electronically controlled coupling 16 connected to thereby connect the left and right rear wheels 19 and 20 as auxiliary drive wheels to the transverse engine 1 (=connect four-wheel drive mode) is selectable. Note that, by releasing the dog clutch 8, it is possible to stop the rotation of the drive system on the downstream side of the dog clutch (rotation of propeller shaft 12 and the like). Thus, friction loss, oil agitation loss and the like may be suppressed, and an improved fuel efficiency is achieved.

The dog clutch 8 is provided in the drive branch or bifurcation position from the left and right front wheels 6 and 7 to the left and right rear wheels 19 and 20, and is intended to cut off the driving force transmission system to the left and right rear wheels 19 and 20 from the driving force transmission system of the left and right front wheels 6 and 7 in response to release of the clutch. An input-side meshing member (not shown) of the dog clutch 8 is connected to a differential case of the front differential 3, and an output-side meshing member (not shown) of the dog clutch 8 is connected to a bevel gear 9. The dog clutch 8, the bevel gear 9, the output pinion 10, and part of the rear wheel output shaft 11 are accommodated in a transfer case 23 fixed to the adjacent, front differential housing 22. As the dog clutch 8, for example, such a configuration is used in which one of a pair of meshing members is installed as a fixed member while the other is set as a movable member with a spring (not shown) disposed between the fixed member and the movable member and biased in the connecting direction, and a screw groove (not shown) is formed in the outer periphery of the moving member so that a solenoid pin (not shown) can be fitted. When the solenoid pin is projected with respect to the screw groove and fitted, the moving member strokes in the releasing direction while rotating, and releases the meshing connection in response to the stroke amount exceeding a predetermined value. On the other hand, when fitting of the solenoid pin to the screw groove is released, the movable member strokes in the connecting direction toward the fixed member by the spring bias and the teeth of the two members interlock for connection.

The electronically controlled coupling 16 is disposed downstream of the dog clutch 8, and serves to allocate part of the driving force from the transverse engine 1 to the left and right rear wheels 19 and 20 in accordance with the clutch torque or connecting capacity. An input side clutch plate 16a of the electronically controlled coupling 16 is connected to the left side gear of the rear differential 15 through a clutch input shaft 16b. An output side clutch plate 16c of the electronically controlled coupling 16 is connected to the left rear wheel drive shaft 17 through a clutch output shaft 16d. The electronically controlled coupling 16 is housed in a coupling case 25 (clutch case) fixed to a rear differential housing 24 located in the adjacent position. As the electronically controlled coupling 16, for example, such a configuration may be used in having a multi-plate friction clutch with a plurality of input-side clutch plates 16a and a plurality of output side clutch plates 16c arranged alternately, a fixed cam piston (not shown) and a movable cam piston (not shown), each formed with a cam surface opposite to each other, and a cam member that is interposed between the opposing cam surfaces. Meshing of the electronically controlled coupling 16 is carried out by a cam action to expand a piston gap which is generated by allowing an electric motor (not shown) to rotate the movable cam piston, movable cam piston stroke in the clutch meshing direction according to the rotation angle, so that the movable cam piston strokes in the clutch connecting direction in accordance with its rotation angle to thereby increase a frictional connecting force of the multi-plate friction clutch. Release of the electronically controlled coupling 16 is carried out by another cam action to narrow the piston gap which is generated by allowing the electric motor to rotate in a direction opposite to the connecting direction, so that the movable cam piston strokes in the clutch releasing direction in accordance with its rotation angle to thereby reduce the frictional connecting force of the multi-plate friction clutch.

The coupling case 25, as shown enlarged in FIG. 1, is formed therein with a clutch chamber 25b and the oil chamber 25c separated from each other by a partition wall 25a. Further, the partition wall 25a is formed with a flow port 25e which can be opened and closed by an on-off valve 25d for enabling circulation of lubricating oil encapsulated in the coupling casing 25. In addition, the clutch chamber 25b and the oil chamber 25c are communicated by an oil passage 25f.

The clutch chamber 25b provides an area for accommodating the electronically controlled coupling 16 in the coupling case 25. The oil chamber 25c provides an area in which the lubricating oil is stored in the coupling case 25, that has moved from the clutch chamber 25b via the oil passage 25f due to the centrifugal force generated by rotation of the electronically controlled coupling 16.

The flow port 25e is a through hole formed in the partition wall 25a, and communicates the clutch chamber 25b and the oil chamber 25c. The on-off valve 25d is configured to open and close the flow port 25e in conjunction with releasing/connecting operation of the electronically controlled coupling 16. That is, the on-off valve 25d is enabled in conjunction with the movable cam piston. When the movable cam piston strokes in the clutch releasing direction, the flow port 25e is driven in the closing direction. On the other hand, when the movable cam piston strokes in the clutch connecting direction, the flow port 25e is driven in the opening direction. Moreover, when the movable cam piston strokes from a completely released state in the clutch connecting direction, the flow port 25e will be gradually opened. In addition, when the electronically controlled coupling 16 is in a released state immediately before connection, the flow port 25e is at a maximum open state, and the maximum open state of the flow port 25e will be maintained as long as the electronically controlled coupling 16 is connected.

The oil passage 25f is a communication passage which constantly communicates the clutch chamber 25b and the oil chamber 25c by bypassing the partition wall 25a. The lubricating oil that has accumulated in the clutch chamber 25b is introduced in this oil passage 25f due to the centrifugal force accompanying the rotation of the electronically controlled coupling 16. The oil passage 25f is inclined to the oil chamber 25c side, so that the introduced lubricating oil is adapted to flow into the oil chamber 25c.

Note that the clutch input shaft 16b penetrates the coupling case 25 and is inserted into the clutch chamber 25b. The clutch output shaft 16d penetrates the coupling casing 25 and the partition wall 25a, and is inserted into the clutch chamber 25b through the oil chamber 25c. Further, in FIG. 1, an oil seal is denoted by a reference numeral 25g, and a bearing is denoted by a reference numeral 25h. The oil seals 25g, while preventing the lubricating oil from leaking from the coupling case 25, rotatably supports the clutch input shaft 16b and the clutch output shaft 16d. The bearing 25h allows circulation of the lubricating oil. The lubricating oil reserved in the oil chamber 25c is allowed to leak in the clutch chamber 25b through the bearing 25h in a small amount even when the flow port 25e is closed by the on-off valve 25d.

Control System for a Four-Wheel Drive Vehicle

Figure 2:
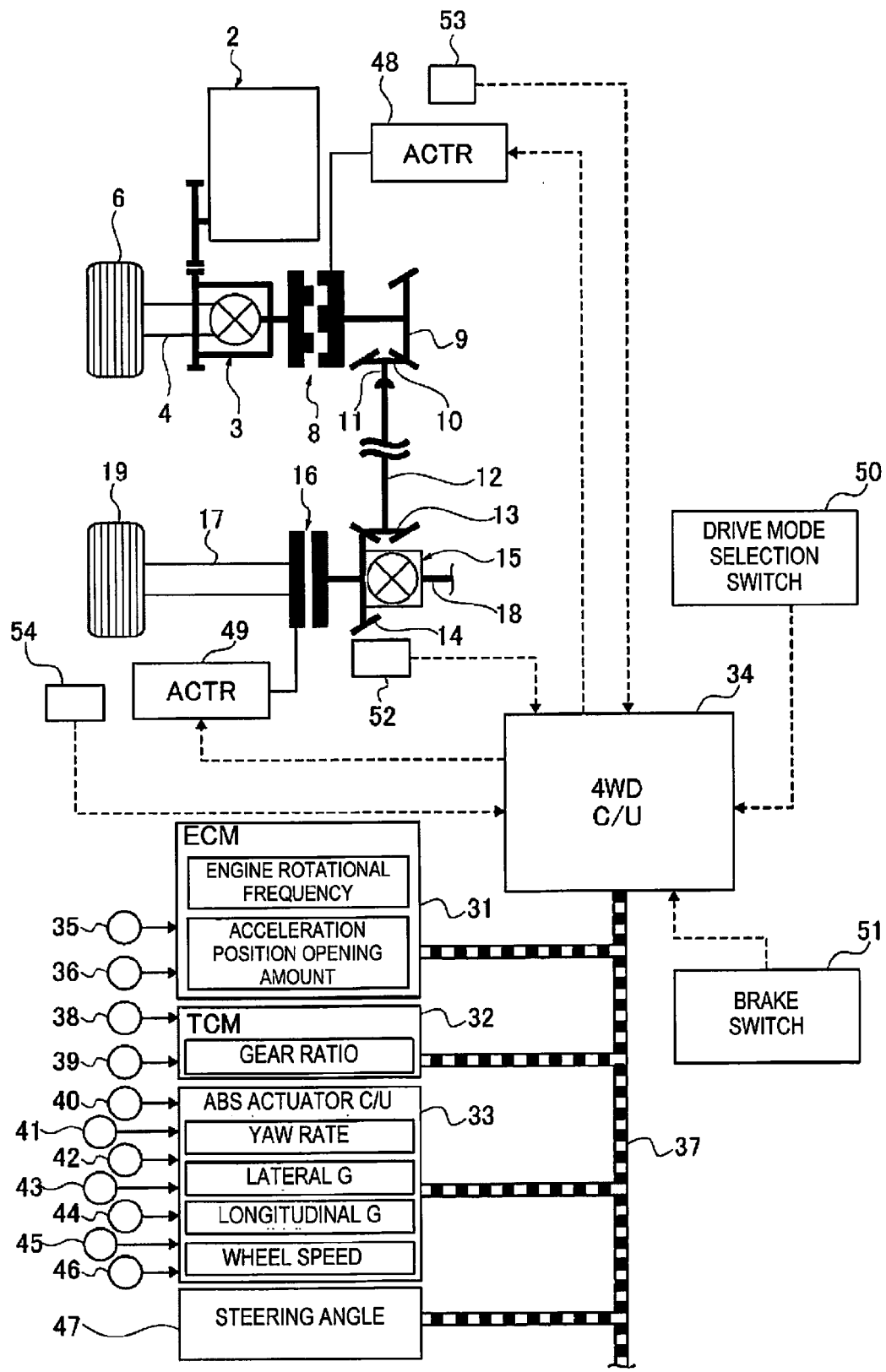
FIG. 2 is a schematic diagram of a control system of a four-wheel drive vehicle of a front wheel drive base to which the clutch control device of the first embodiment is applied.

FIG. 2 schematically illustrates a control system for a four-wheel drive vehicle of a front wheel drive base to which a clutch control device is applied. Below, with reference to FIG. 2, description is given of the control system of the four-wheel drive vehicle.

The four-wheel drive vehicle control system, as shown in FIG. 2, includes an engine control module 31 (denoted as "ECM" in FIG. 2), a transmission control module 32 (denoted as "TCM" in FIG. 2), an ABS actuator control unit 33 (denoted as "ABS actuator C/U" in FIG. 2), and a 4WD control unit 34 (denoted as "4WD C/U" in FIG. 2).

The engine control module 31 is a control device of the transverse engine 1 and receives detection signals from an engine speed sensor 35, an accelerator opening sensor 36, and the like. Through this engine control module 31, the 4WD control unit 34 receives, via the CAN communication line 37, the engine speed information and the accelerator opening information (ACC information).

The transmission control module 32 is a control device of the transmission 2, and receives detection signals from a transmission input speed sensor 38, a transmission output speed sensor 39 and the like. Through this transmission control module 32, the 4WD control unit 34 receives, via the CAN communication line 37, the gear ration information (speed ratio information).

The ABS actuator control unit 33 is a control device of the ABS actuator (not shown) for controlling the brake fluid pressure of each wheel, and receives detection signals from a yaw rate sensor 40, a lateral G sensor 41, a longitudinal G sensor 42, and wheel speed sensors 43, 44, 45, 46, and the like. Through the ABS actuator control unit 33, the 4WD control unit 34 receives, via the CAN communication line 37, the wheel speed information, the yaw rate information, and the lateral G information, the longitudinal G information, and wheel speed information of each wheel. Note that, in addition to the above information, steering angle information from the steering angle sensor 47 is input to the 4WD control unit 34 via the CAN communication line 37.

The 4WD control unit 34 is a control device for controlling the connecting/releasing of the dog clutch 8 as well as the electronically controlled coupling 16, and performs arithmetic processing based on various input information. Also, the 4WD control unit 34 outputs a drive control command to a dog clutch actuator 48 (solenoid pin) and an electronically controlled coupling actuator 49 (electric motor). Here, as the input sources other than the CAN communication line 37, a drive mode selection switch 50, a brake switch 51 for detecting the presence or absence of brake operation, a ring gear rotation speed sensor 52, a dog clutch stroke sensor 53, a motor rotational angle sensor 54 and the like are provided.

The drive mode selection switch 50 is a switch operable by the driver for selecting "2WD mode", "Lock mode" and "Auto mode". When the "2WD mode" is selected, a 2WD state (2-wheel drive) is maintained in which the front wheels are driven with the dog clutch 8 and the electronically controlled coupling 16 released. When the "Lock mode" is selected, a full 4WD state (4-wheel drive) is maintained with the dog clutch 8 and the electronically controlled coupling 16 connected. Further, when the "Auto mode" is selected, the drive mode is automatically switched by automatically controlling connecting/releasing of the dog clutch 8 and the electronically controlled coupling 16 in accordance with the vehicle state (vehicle speed, accelerator opening).

Here, in the "auto mode", there is a choice of an "Eco-auto mode" to be selected when focusing on improving fuel efficiency and a "Sport-auto mode" to be selected when focusing on four-wheel-drive performance. Depending on the choice selected, i.e. selection mode, the state of the electronically controlled coupling 16 is different in a standby two-wheel drive mode with the dog clutch 8 connected and the electronically controlled coupling 16 released. More specifically, at the time of selection of the "Eco-auto mode", in the Standby two-wheel drive mode, the electronically controlled coupling 16 is placed in a stand-by state in a completely released state. At this time, the flow port 25e is closed by the on-off valve 25d so that the lubricating oil is stored in the oil chamber 25c. In contrast, at the time of selection of the "Sport-auto mode", in the standby two-wheel drive mode, the electronically controlled coupling 16 is placed in the stand-by state with electronically controlled coupling 16 in the released state immediately before connection. At this time, the on-off valve 25d opens the flow port 25e, and the lubricating oil flows into the clutch chamber 25b. Note that the "Eco-auto mode" and "Sport-auto mode" are subject to selection arbitrarily by the driver.

Further, the "completely released state" is referred to a state in which the input side clutch plate 16a and the output side clutch plate 16c of the electronically controlled coupling 16 are separated from each other, and both plates 16a and 16c are maintained free from any contact without generating a clutch connecting capacity immediately after the stroke of the movable cam piston in the clutch connecting side. In addition, the "released state immediately before connection" is referred to a state in which, although the clutch connecting capacity is zero, the input side clutch plate 16a and the output side clutch plate 16c are in contact slightly, and a slight stroke of the movable cam piston in the clutch connecting direction would cause an immediate occurrence of the clutch connecting capacity.

The ring gear rotation speed sensor 52 is intended to be a sensor for acquiring the output speed information of the dog clutch 8, and calculates the output rotation speed of the dog clutch 8 by considering, in addition to the ring gear rotation speed detected value, the rear side gear ratio and the front side gear ratio. The input rotation speed information of the dog clutch 8 is obtained by calculation using the engine speed, gear ratio, and the final gear ratio.

Drive Mode Switching

Figure 3:
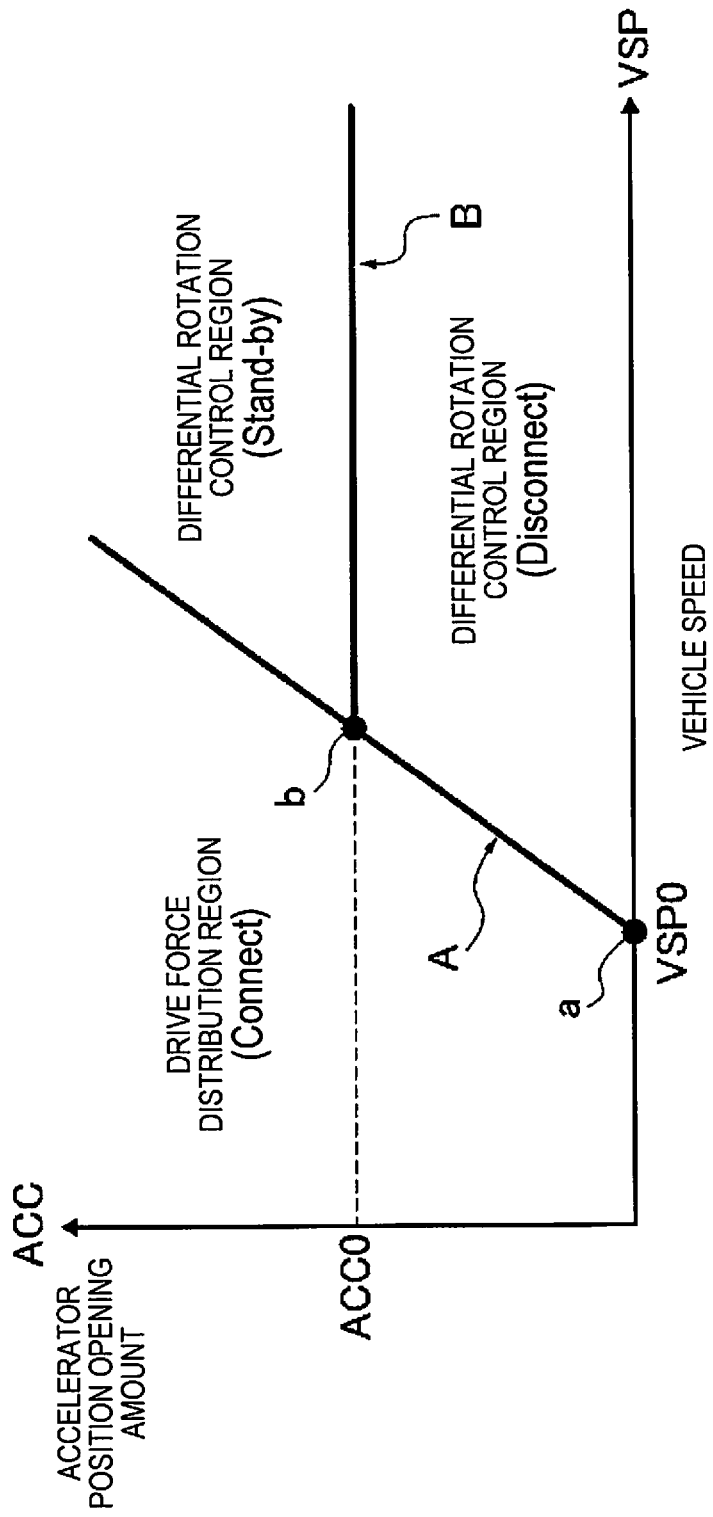
FIG. 3 is a base map illustrating a drive mode switching map based on a vehicle speed and an accelerator position opening amount at the time of selection of "auto mode" in the first embodiment.
Figure 4:
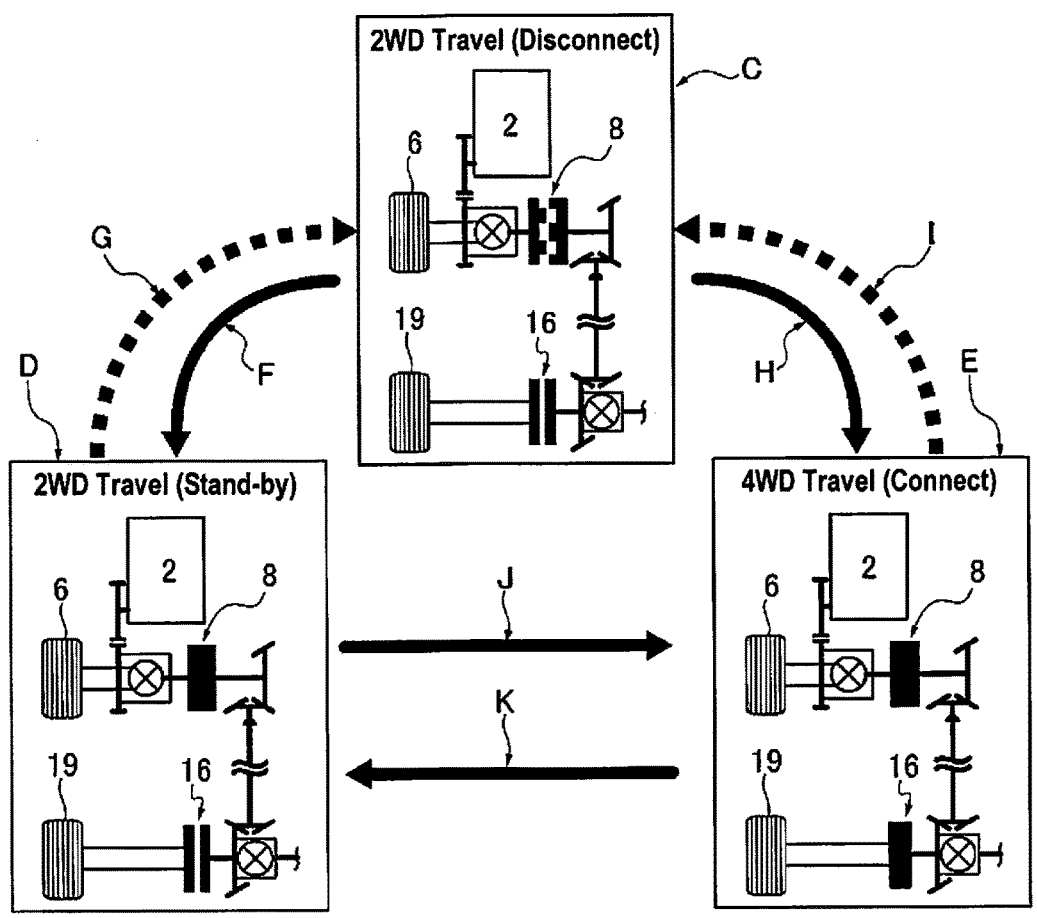
FIG. 4 is a drive mode transition diagram illustrating the switching transition of the drive modes (disconnect two-wheel drive mode, standby two-wheel drive mode, and connect four-wheel drive mode) at the time of selection of "auto mode" in the first embodiment.

FIG. 3 is a drive mode switching graph based on a vehicle speed and an accelerator opening at the time of selection of "Auto mode". FIG. 4 shows the switching transition of the drive modes (disconnect two-wheel drive mode, standby two-wheel drive mode, and connect four-wheel drive mode). Below, with reference to FIGS. 3 and 4, a description is given of the drive mode switching configuration.

In the first embodiment, as the drive modes when the "Auto mode" is selected, the disconnect two-wheel drive mode (Disconnect), standby two-wheel drive mode (Standby), and connect four-wheel drive mode (Connect) are available. Further, switching among the three drive modes is made based on the drive mode switching map shown in FIG. 3 by the 4WD control unit 34 based on the vehicle speed (VSP) and the accelerator opening (ACC) representative of the required driving force of the driver. That is, the 4WD control unit 34 corresponds to a drive mode switching unit for switching the drive mode to any one of the three drive modes.

In accordance with the vehicle speed and the accelerator opening, the drive mode switching map, as shown in FIG. 3, is configured to be divided into the disconnect two-wheel drive mode (referred to as "differential speed control region (Disconnect)" in FIG. 3), standby two-wheel drive mode (referred to as "differential speed control region (Stand-by)" in FIG. 3), and connect four-wheel drive mode (referred to as "driving force distribution region (Connect)" in FIG. 3), respectively. The three drive modes is divided by a region dividing line A in which the accelerator opening is increased in proportion to increase in the vehicle speed from a base point "a" which set at a vehicle speed VSP0 (threshold vehicle speed) with the accelerator opening zero and another region dividing line B (threshold required driving force) defined by a constant accelerator opening ACC0 starting from an intersection b with the region dividing line A in a high vehicle speed direction.

The disconnect two-wheel drive mode (differential rotation control region (Disconnect)) is defined in a region surrounded by a vehicle speed axis with the accelerator opening zero, the region dividing line A, and the region dividing line B where the accelerator opening is set at ACC0 or below. That is, the mode corresponds to the region in which, since the accelerator opening is equal to or below the predetermined opening ACC0 (driver requested driving force is low) despite a high vehicle speed region, the differential rotation between the left and right front wheels 6 and 7 and the left and right rear wheels 19 and 20 occurs rarely due to the drive slip. Further, even when the drive slip occurs, the increase is slow and gentle, and thus the demand for four-wheel drive performance is low.

The stand-by two-wheel drive mode (differential rotation control region (Stand-by)) is defined in a region which exceeds the preset accelerator opening ACC0, and is surrounded by the region dividing line A and the region dividing line B. That is, the mode corresponds to the region in which, since the accelerator opening exceeds the preset opening ACC0 (driver requested driving force is high), though low in the demand for four-wheel driving performance, once the differential rotation occurs between the left and right front wheels 6 and 7 and the left and right rear wheels 19 and 20, it is highly likely that the slip increases rapidly.

The Connect four-wheel drive mode (driving force distribution region (Connect A)) is defined in a region surrounded by a vehicle speed axis with the accelerator opening being zero, the region dividing line A, and the region dividing line B. In other words, the mode corresponds to the region in which the demand for four wheel performance is high at the time of vehicle start or high load travel with a large accelerator opening with low vehicle speed (low vehicle speed region).

Once the disconnect two-wheel drive mode is selected, as shown in a frame line C in FIG. 4, "the "2WD travel (Disconnect) mode" is in place in which the dog clutch 8 and electronically controlled coupling 16 are both released. In the disconnect two-wheel drive mode, two-wheel drive traveling by the front wheel drive (hereinafter referred to as "2WD traveling") is maintained in which the driving force is essentially transmitted only to the left and right front wheels 6 and 7. However, when a drive slip occurs in the left and right front wheels 6 and 7 during the 2WD traveling and the amount of the drive slip (or drive slip ratio) is more than a threshold, the electronically controlled coupling 16 is frictionally connected. Subsequently, when a rotational synchronization state is determined, the dog clutch 8 is in meshing connection to transfer to a 4WD traveling (hereinafter referred to as "4WD traveling"). Accordingly, the differential rotation control to suppress the driving slip takes place by allocating the driving force to the left and right rear wheels 19 and 20 as well.

When the stand-by two-wheel drive mode is selected, as shown in the frame line D in FIG. 4, the dog clutch 8 is connected and the electronically controlled coupling 16 is released to introduce the "2WD traveling (Stand-by)". In this stand-by two-wheel drive mode, although the dog clutch 8 is meshed for connection, the driving force is essentially transmitted only to the left and right front wheels 6 and 7 to maintain the 2WD traveling of front wheel drive. However, when a drive slip occurs in the left and right front wheels 6 and 7 during the 2WD traveling of front wheel drive and the amount of drive slip (or drive slip rate) exceeds a threshold, since the dog clutch 8 is meshed in advance, only the frictional coupling of the electronically controlled coupling 16 is performed. Due to the frictional connection of the electronically controlled coupling 16, by distributing the driving force to the left and right rear wheels 19 and 20 with a good response, the differential rotation control to suppress the driving slip may be performed.

When the Connect four-wheel drive mode is selected, as shown in a frame line E in FIG. 4, the dog clutch 8 and electronically controlled coupling 16 are both connected to reach the "4WD traveling (Connect)". In this Connect 4WD mode, an optimal driving force distribution control takes place in which the driving force is optimally distributed between the left and right front wheels 6 and 7 and the left and right rear wheels 19 and 20 (distribution control between front and rear wheels at the time of vehicle start, for example) to suit the road conditions basically. However, during the driving force distribution control, when a vehicle turning state is determined based on the information from the steering angle sensor 47, the yaw rate sensor 40, the lateral G sensor 41, and longitudinal G sensor 42, control is performed to suppress the tight corner braking phenomenon by reducing the connecting or torque capacity the electronically controlled coupling 16.

A switching transition takes place among the disconnect two-wheel drive mode (2WD traveling (Disconnect)), the stand-by two-wheel drive mode (2WD traveling (Stand-by)), the connect 4WD drive mode (4WD traveling (Connect)) in response to a switching request being output when an operating point determined by the vehicle speed and the accelerator opening crosses the regions dividing line A or the region dividing line B shown in FIG. 3. With respect to the switching transition speed to respective drive modes is set such that the transition speed to the drive mode in response to 4WD request is given priority over the transition speed to the disconnect two-wheel drive mode to meet fuel economy requirements.

More specifically, with respect to the switching transition speed from the 2WD traveling (Disconnect) to 2WD traveling (Stand-by) (arrow F in FIG. 4), the switching transition speed from the 2WD traveling (Stand-by) to the 2WD traveling (arrow G in FIG. 4) is set slower. Similarly, with respect to the switching transition speed from the 2WD traveling (Disconnect) to the 4WD traveling (Connect) (arrow H in FIG. 4), the switching transition speed from the 4WD traveling (Connect) to the 2WD traveling (Disconnect) (arrow I in FIG. 4) is made slower. On the other hand, the switching transition speed from the 2WD traveling (Stand-by) to the 4WD traveling (Connect) (arrow J in FIG. 4) and the switching transition speed from the 4WD traveling (Connect) to the 2WD traveling (Stand-by) (arrow K in FIG. 4) is in the same speed. Further, the "transition speed" is referred to the time for transition completion after a switching request occurs. Here, when the transition speed is slow (arrow G, arrows I), the mode transition control starts after the elapse of a predetermined time following a switching request output. In addition, when the transition speed is fast (arrow F, the arrow H, arrow J, and arrow K), the mode transition control starts immediately after the switching request output.

Drive Mode Switching Process

Figure 5:
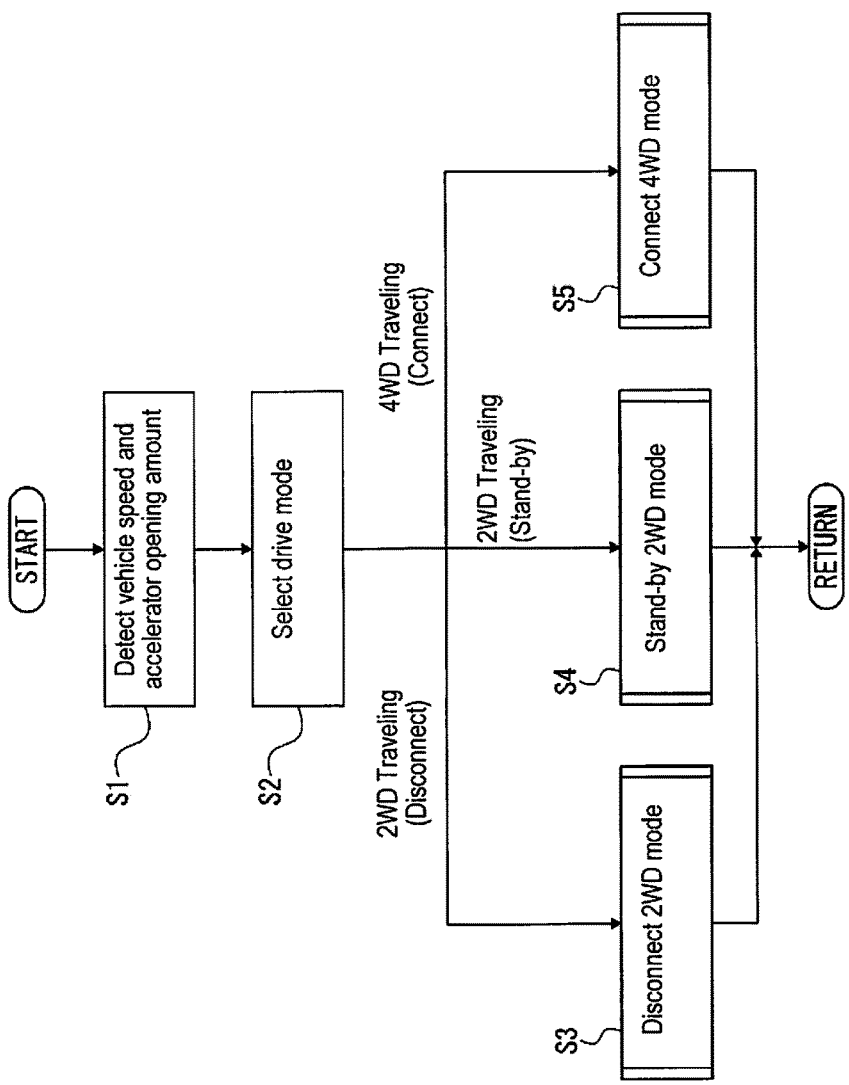
FIG. 5 is a flowchart illustrating a flow of a drive mode switching process executed by the 4WD control unit in the first embodiment.

FIG. 5 illustrates a flow of the drive mode switching process executed by the 4WD control unit. Below, a description is given of each step in FIG. 5 representing the drive mode switching process. Note that the drive mode switching process is executed when the "Auto mode" is selected by the drive mode selection switch 50.

In step S1, the current vehicle speed and the accelerator opening are detected, and control proceeds to step S2. Here, the vehicle speed is calculated from the wheel speeds of the left and right rear wheels 19 and 20, which in turn are detected by the wheel speed sensors 45 and 46, respectively. The accelerator opening is detected by the accelerator opening sensor 36.

In step S2, following the detection of the vehicle speed and the accelerator opening in step S1, based on the detected vehicle speed and the accelerator opening and in accordance with the drive mode switching map shown in FIG. 3, a drive mode is selected. Depending on the drive mode thus selected, control proceeds to one of step S3, step S4, and step S5. That is, when the vehicle speed is a higher than the region dividing lines A, and the accelerator opening is lower than the region dividing line B, the disconnect two-wheel drive mode (2WD traveling (Disconnect)) is selected, and control proceeds to step S3. Further, when the vehicle speed is a higher than the region dividing lines A, and the accelerator opening is larger than the region dividing line B, the stand-by two-wheel drive mode (2WD traveling (Stand-by)) is selected, and control proceeds to step S4. Still further, when the vehicle speed is lower than the region dividing lines A, the Connect four-wheel drive mode (4WD traveling (Connect)) is selected, and the process moves on to step S5.

In step S3, following the selection of the disconnect two-wheel drive mode in step S2, the disconnect two-wheel drive mode process to be described below is executed, and control proceeds to RETURN.

In step S4, following the selection of the standby two-wheel drive mode in step S2, the stand-by two-wheel drive mode process to be described below is executed, and control proceeds to RETURN.

In step S5, following the selection of the Connect four-wheel drive mode in step S2, the Connect four-wheel drive mode process is executed to be described below, and control goes to return.

Figure 6:
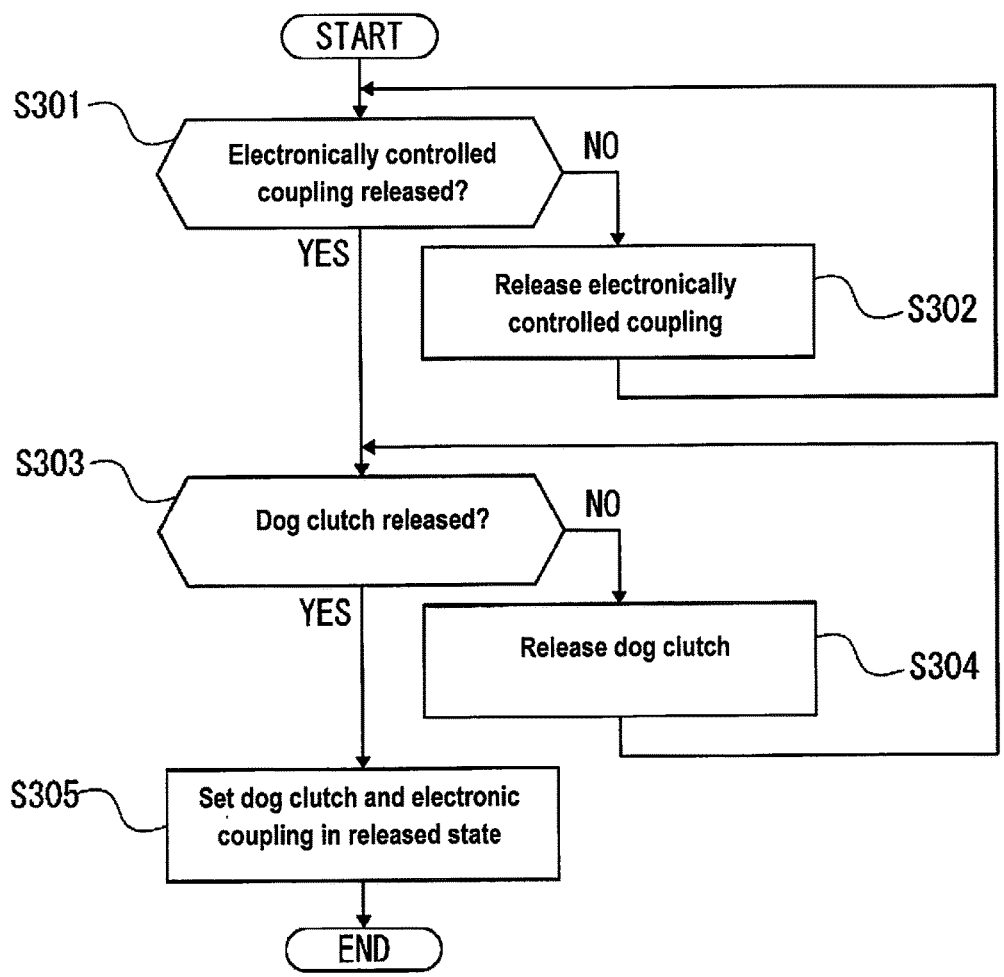
FIG. 6 is a flowchart illustrating a flow of the disconnect the two-wheel drive mode process executed by the 4WD control unit in the first embodiment.

The disconnect two-wheel drive mode process executed in step S3 has the steps shown in FIG. 6. Below, a description is given of each step of the disconnect two-wheel drive mode process.

In step S301, it is determined whether or not the electronically controlled coupling 16 is in a released state. If YES (i.e., electronically controlled coupling is released), control proceeds to step S303. If NO (electronically controlled coupling connected), control proceeds to step S302. Here, the released state of the electronically controlled coupling 16 is determined based on the detected value of the motor rotation angle sensor 54.

In step S302, subsequent to the determination on the electronically controlled coupling connection in step S301, a releasing command is output to completely release the electronically controlled coupling 16, and control returns to step S301. Here, by outputting the complete releasing command of the electronically controlled coupling 16, the movable cam piston strokes in the releasing direction in response to the electronically controlled coupling actuator 49 to thereby bring the electronically controlled coupling in a completely released state.

In step S303, following the determination of complete release of the electronically controlled coupling in step S301, it is determined whether or not the dog clutch 8 is in a released state. If YES (dog clutch released), control proceeds to step S 305. In the case of NO (dog clutch meshed), control proceeds to step S304. Here, the released state of the dog clutch 8 is determined based on the detected value of the dog clutch stroke sensor 53.

In step S304, following the determination of the dog clutch connection in step S 303, a releasing command is output to release the dog clutch 8, and control returns to step S303. Here, in response to the output of the releasing command of the dog clutch 8, the solenoid pin and the movable member are fitted together by the dog clutch actuator 48, and the movable member will rotate to allow the movable member to stroke in the releasing direction to thereby render the dog clutch 8 in a released state.

In step S305, subsequent to the determination on the dog clutch release in step S303, both of the dog clutch 8 and the electronically controlled coupling 16 is put in standby state in the released states, the process goes to End. Note that, in this disconnect two-wheel drive mode, when the drive slip in the left and right front wheels 6 and 7 has occurred, the electronically controlled coupling 16 and the dog clutch 8 are connected in order to distribute the driving force to the left and right rear wheels 19 and 20 so that the differential rotation control is started to suppress the driving slip. Then, when the drive slip settles out, the electronically controlled coupling 16 and the dog clutch 8 are released in sequence.

Figure 7:
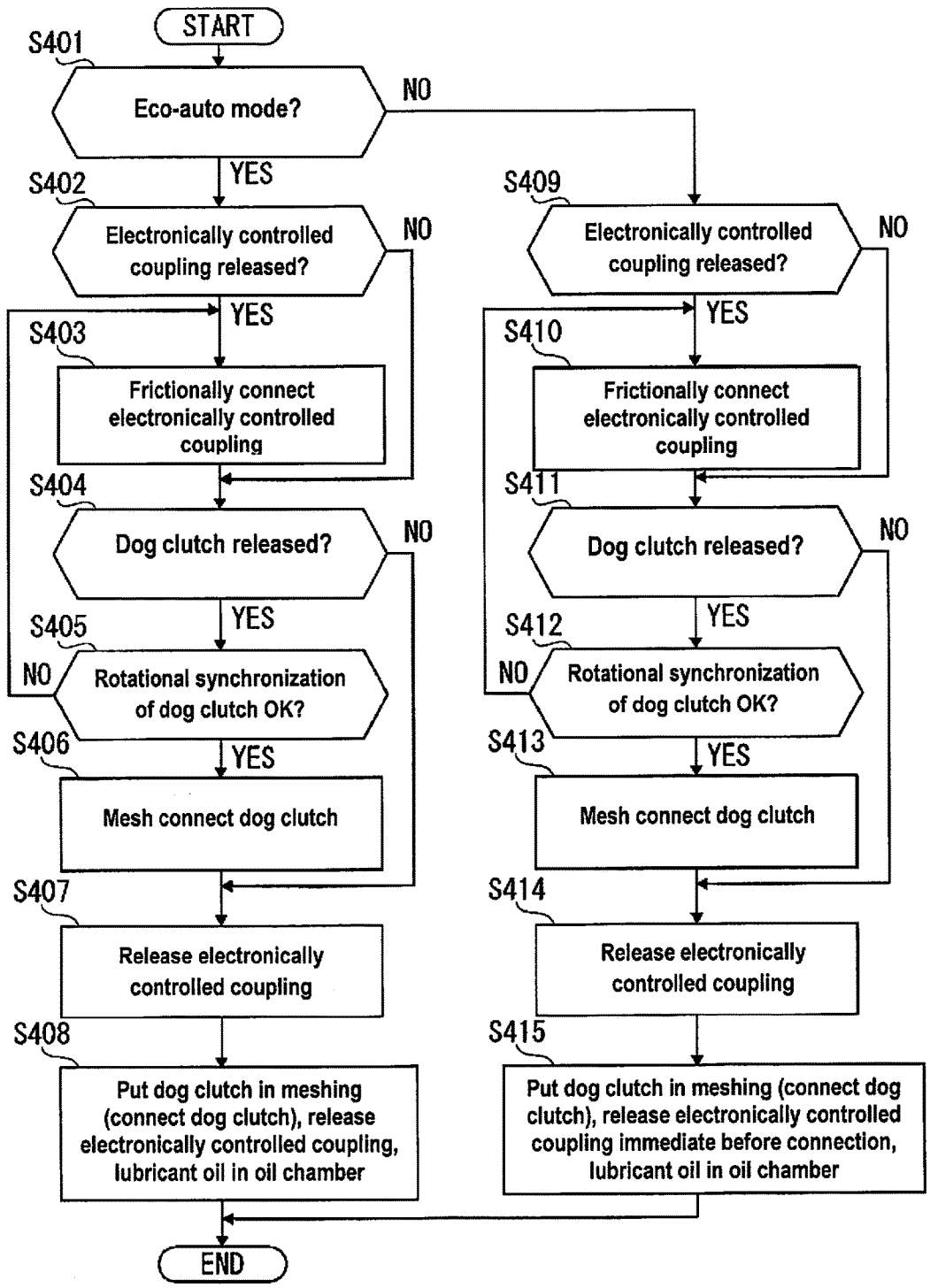
FIG. 7 is a flowchart illustrating a flow of the standby two-wheel drive mode process executed by the 4WD control unit in the first embodiment.

The stand-by two-wheel drive mode process executed in step S4 includes the steps shown in FIG. 7. Below, a description will be given of each step of the standby two-wheel drive mode process.

In step S401, it is determined whether or not the "Eco-auto mode" is selected. If YES (Eco-auto mode selected), control proceeds to step S402. If NO (Sport-auto mode selected), control proceeds to step S409. The selection determination of the "Eco-auto mode" is made based on the selection result by the drive mode selection switch 50.

In step S402, following the determination on the "Eco-Auto Mode" selection in step S401, it is determined whether or not the electronically controlled coupling 16 is in a released state. If YES (electronically controlled coupling released), control proceeds to step S403. If NO (electronically controlled coupling connected), control proceeds to step S404.

In step S403, following the determination of the electronically controlled coupling release in step S402 or the determination that the rotational synchronization of the dog clutch 8 is NO in step S405, a connection command to frictionally connect the electronically controlled coupling 16 is output, and control advances to step S404. Here, in response to the output of the connection command of the electronically controlled coupling 16, the movable cam piston is caused to stroke in the connecting direction by the electronically controlled coupling actuator 49, and the electronically controlled coupling 16 is connected.

In step S404, following the determination of the electronically controlled coupling connection in step S402, or following the output of the connection command of the electronically controlled coupling 16 in step S403, it is determined whether or not the dog clutch 8 is in a released state. If YES (dog clutch released), control proceeds to step S405. In the case of NO (dog clutch connected), control proceeds to step S407.

In step S405, following the determination of the dog clutch release in step S404, it is determined whether or not the rotational synchronization state of the dog clutch 8 is confirmed. If YES (rotational synchronization OK), control proceeds to step S406. If NO (rotational synchronization NG), control returns to step S403. Here, by frictional connection of the electronically controlled coupling 16, rotation of the left and right rear wheels 19 and 20 is transmitted to the bevel gear 9 via a propeller shaft 12, etc., and the output side meshing member of the dog clutch 8 that is connected to the bevel gear 9 is rotated. Further, the input-side meshing member of the dog clutch 8, which is connected to the differential case of the front differential 3 is rotated by the rotation of the left and right front wheels 6 and 7. The determination of the rotational synchronization state is made by confirming that the rotation speed difference between the input-side meshing member of the dog clutch 8 connected to the differential case of the front differential gear 3 and the output side meshing member of the dog clutch 8 connected to the bevel gear 9 falls below a predetermined value.

In step S406, following the determination that the rotational synchronization of the dog clutch 8 is OK in step S405, a connection command for meshing connection of the dog clutch 8 is output, and control proceeds to step S407. Here, the output of the connection command of the dog clutch 8 allows the dog clutch actuator 48 to release the fitting between the solenoid pin and the movable member and to stroke the moving member in the connecting direction by a spring bias to thereby connect the dog clutch 8.

In step S407, following the determination of the dog clutch connection in step S404, or following the output of the connection command of the dog clutch 8 in step S406, a releasing command will be output to completely release the electronically controlled coupling 16, and control proceeds to step S408.

In step S408, followed the output of the complete releasing command of the electronically controlled coupling 16 in step S407, the dog clutch 8 is put in a connected or meshed state and the electronically controlled coupling 16 is put in a completely released state, to thereby put in a stand-by state. Then, control ends. Here, by putting the electronically controlled coupling 16 in the complete released state, the on-off valve 25d closes the flow port 25e, and the lubricating oil is stored in the oil chamber 25c. Note that, in the stand-by two-wheel drive mode in the "Eco-Auto mode", when the drive slip in the left and right front wheels 6 and 7 is generated, by connecting the electronically controlled coupling 16 and distributing the driving force to the left and right rear wheels 19 and 20, the difference rotation control to reduce the drive slip is done. Then, when the drive slip is converged, the electronically controlled coupling 16 is put in a completely released state.

In step S409, following the determination of the "Sport-auto mode" selection in step S401, it is determined whether or not the electronically controlled coupling 16 is in a released state. If YES (electronically controlled coupling released), control proceeds to step S410. If NO (electronically controlled coupling connected), control proceeds to step S411.

In step S410, following the determination of the electronically controlled coupling release in step S409, or, following the determination of the rotational synchronization of the dog clutch 8 being NG in step S412, a connection command for frictional connection of the electronically controlled coupling 16 is output, and control proceeds to step S411.

In step S411, following the determination of the electronically controlled coupling connection in step S409, or, following the output of the connection command of the electronically controlled coupling 16 in step S410, it is determined whether or not the dog clutch 8 is in a released state. If YES (dog clutch released), control proceeds to step S412. In the case of NO (dog clutch connected), control proceeds to step S414.

In step S412, following the determination of the dog clutch release in step S 411, it is determined whether or not the rotational synchronization state of the dog clutch 8 is confirmed. If YES (rotational synchronization OK), control proceeds to step S413. If NO (rotational synchronization NG), control returns to step S410.

In step S413, after judging that the rotational synchronization OK of the dog clutch 8 in step S412, and outputs the meshing command to the fastening meshing of the dog clutch 8, the process proceeds to step S414.

In step S414, following the determination of the dog clutch connection or meshing in step S411, or, following the output of the connection command of the dog clutch 8 in step S413, a releasing command of the electronically controlled coupling 16 in the released state immediately before connection, and control advances to S415.

In step S415, following the output of the releasing command to the released state of the electronically controlled coupling 16 immediately before connection in step S414, the dog clutch 8 is put in a meshed state, the electronically controlled coupling 16 is brought in a released state immediately before connection and thereby set in a stand-by state. Subsequently, control goes to the end. Here, by bringing the electronically controlled coupling 16 to the state immediately before connection, the on-off valve 25*d* opens the flow port 25*e*, and the lubricating oil flows into the clutch chamber 25*b*. In this "Sport-auto mode" in the stand-by two-wheel drive mode, when the drive slip in the left and right front wheels 6 and 7 is generated, a difference rotation control to reduce the drive slip is done by connecting the electronically controlled coupling 16 and distributing the driving force to the left and right rear wheels 19 and 20. Then, the drive slip settles out, the electronically controlled coupling 16 is released to produce a released state immediately before connection.

Figure 8:
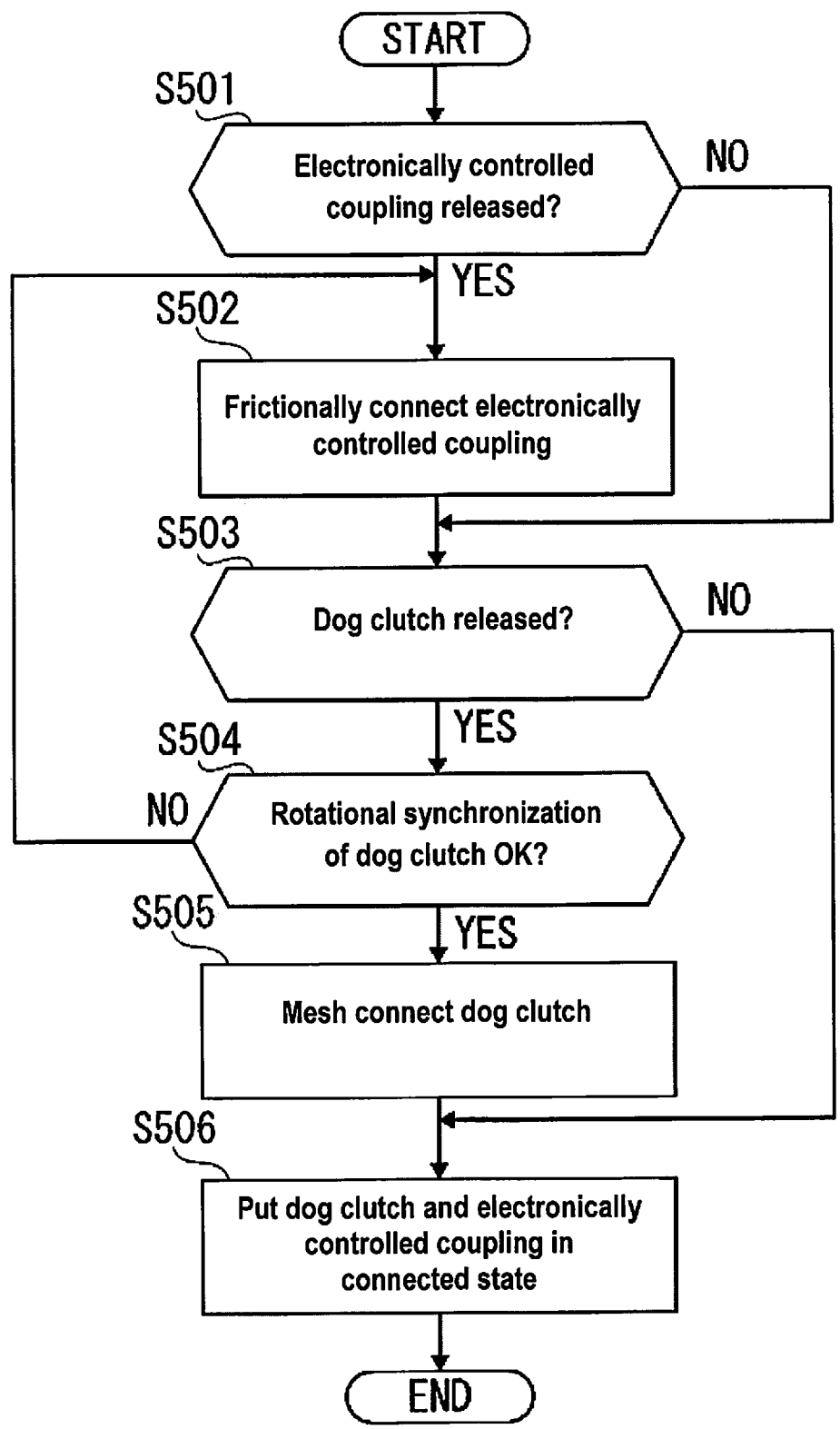
FIG. 8 is a flowchart illustrating a flow of the connect four-wheel drive mode process executed by the 4WD control unit in the first embodiment.

The Connect four-wheel drive mode process executed in step S5 has steps shown in FIG. 8. Below, a description will be given of each step of the Connect four-wheel drive mode process.

In step S501, it is determined whether or not the electronically controlled coupling 16 is in a released state. If YES (electronically controlled coupling released), control proceeds to step S502. If NO (electronically controlled coupling connected), control proceeds to step S503.

In step S502, following the determination of the electronically controlled coupling release in step S501, or following the determination of the rotational synchronization of the dog clutch 8 being NG at step S504, a connection command to frictionally connect the electronically controlled coupling 16 is output. Subsequently, control proceeds to step S503.

In step S503, following the determination of the electronically controlled coupling connection in step S501, or following the output of the connection command of the electronically controlled coupling 16 in step S502, it is determined whether or not the dog clutch 8 is released. If YES (dog clutch released), control proceeds to step S504. In the case of NO (dog clutch connected), control proceeds to step S506.

In step S504, following the determination of the dog clutch release in step S503, it is determined whether or not the rotational synchronization state of the dog clutch 8 is confirmed. If YES (rotational synchronization OK), control proceeds to step S505. If NO (rotational synchronization NG), control returns to step S502.

In step S505, following the determination that the rotational synchronization of the dog clutch 8 is OK in step S504, a connection command is output for meshing connection of the dog clutch, and control proceeds to step S506.

In step S506, following the dog clutch connection in step S503, or, following the output of the connection command of the dog clutch 8 in step S505, both of the dog clutch 8 and the electronically controlled coupling 16 are put in a stand-by mode by putting both in an connected state, and control moves on to end. Note that, in this Connect four-wheel drive mode, by controlling the connecting force of the electronically controlled coupling 16, with respect to the left and right front wheels 6 and 7, and the left and right rear wheels 19 and 20, the optimal driving force distribution control for the driving force distribution is carried out tailored to the road conditions and driving conditions.

Next, description will be given of the operation of the clutch control device for a four-wheel drive vehicle of the first embodiment, separately in the "drive mode switching operation", and "switching timing setting operation of the drive mode".

Drive Mode Switching Operation

Figure 9:
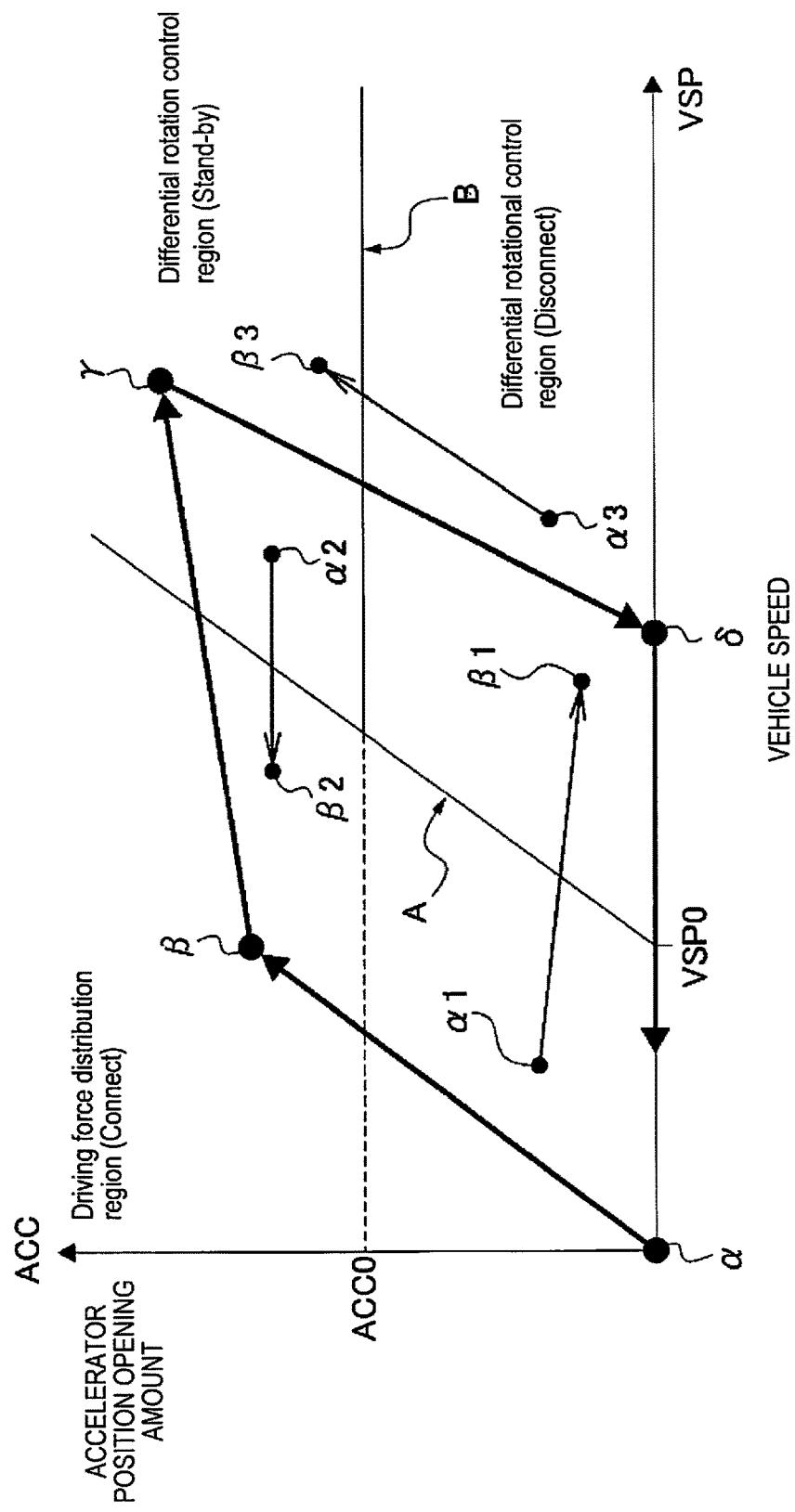
FIG. 9 is an explanatory diagram illustrating the movement of the operating point on a drive mode switching map in the four-wheel drive vehicle in the first embodiment.

FIG. 9 is an explanatory flow diagram showing the movement of the operating point on the drive mode switching map in the four-wheel drive vehicle in the first embodiment. Below, with reference to FIG. 9, a description is give of the drive mode switching operation of the embodiment 1.

In the four-wheel drive vehicle in the first embodiment, when the driver selects the "Auto mode", the drive mode switching process shown in FIG. 5 is executed. Here, since the vehicle is stopped before the vehicle starts, the vehicle speed is zero. In addition, an accelerator opening is also zero because the accelerator is not depressed. Therefore, as shown in FIG. 9, the operating point on the drive mode switching map is positioned at point α (alpha).

Then, when the accelerator pedal is depressed and the vehicle is started, the operating point moves to the position of the point β. At this time, since both point α and point β are in the Connect four-wheel drive mode (driving force distribution region (Connect)), in the flowchart shown in FIG. 5, control proceeds from step S1, via step S2, to step S5, and the Connect four-wheel drive mode process is performed. That is, at the time of vehicle start, when the dog clutch 8 and the electronically controlled coupling 16 are both connected, in the flowchart shown in FIG. 8, control proceeds from step S501 to step S506 via S503, and the dog clutch 8 and the electronically controlled coupling 16 are moth maintained in the connected state to perform the 4WD traveling by distributing the driving force to the left and right front wheels 6 and 7 to the left and right rear wheels 19 and 20.

Further, when the dog clutch 8 and the electronically controlled coupling 16 are both released at the time of vehicle start, in the flowchart shown in FIG. 8, control proceeds from step S501 to step S502, and the electronically controlled coupling 16 is frictionally coupled. Thus, the rotation of the left and right rear wheels 19 and 20 is transmitted from the left and right rear wheels drive shafts 17, 18 through the electronically controlled coupling 16, the rear differential 15, the ring gear 14, and the drive pinion 13, to the propeller shaft 12, to thereby rotate the propeller shaft 12. Further, the distal end of the propeller shaft 12 is connected to the output side meshing member through the output pinion 10 and the bevel gear 9. Therefore, by frictional connection of the electronically controlled coupling 16, the left and right rear wheels 19, 20 are rotated to thereby rotate the output side meshing member of the dog clutch 8.

On the other hand, the input-side meshing member of the dog clutch 8 is rotated by the front-wheel driving system, because the input-side member is connected to the differential case of the front differential 3. Further, as the connecting force of the electronically controlled coupling 16 increases, the rotation speed of the output-side meshing member of the dog clutch 8 increases. When the dog clutch 8 is rotated in a synchronous state, control proceeds from step S503 through step S504 to step S505, and the dog clutch 8 is meshed.

Then, control proceeds to step S506 where both of the dog clutch 8 and the electronically controlled coupling 16 are maintained in the connected state, and the 4WD traveling is carried out by transmitting the driving force to the left and right front wheels 6, 7 and to the left and right rear wheels 19 and 20. In this Connect four-wheel drive mode, by controlling the connecting force of the electronically controlled coupling 16, an optimal driving force distribution control to the driving force distribution is carried out with respect to the left and right front wheels 6 and 7 and the left and right rear wheels 19 and 20, tailored to the road conditions and driving conditions.

Then, such a case is assumed in which, as the vehicle speed is gradually increased, and the operating point on the drive mode switching map crosses the region dividing line A to move on the position of point γ. At this time, since the operating point reaches in a higher vehicle speed region than the region dividing line A, while maintaining the accelerator opening with a set opening ACC0 or above, the system will move to the Standby two-wheel drive mode (differential rotation control region (Standby). That is, when the operating point crosses the region dividing lines A, a switching request from the Connect four-wheel drive mode to the Standby two-wheel drive mode is outputted.

Thus, in the flowchart shown in FIG. 5, control proceeds from step S1 through step S2 to step S4, and the stand-by two-wheel drive mode process is performed. More specifically, control proceeds to step S401 in the flowchart shown in FIG. 7, and it is determined whether or not "Eco-auto mode" is selected. If "Eco-auto mode" is selected, control proceeds to step S402. Here, since the switching request from the connect four-wheel drive mode to the standby two-wheel drive mode is output, both the dog clutches 8 and the electronically controlled coupling 16 have already been connected. Thus, control proceeds from step S402 through step S404 to step S407, to release the electronically controlled coupling 16.

Then, control proceeds to step S408, and the dog clutch 8 is put in a connected state while the electronically controlled coupling 16 is put in a completely released state. Thus, of the rear wheel drive system, the drive system downstream of the electronically controlled coupling 16 is disconnected from the front wheel drive system so that the 2WD traveling of front-wheel drive is carried out by transmitting the driving force only to the left and right front wheels 6 and 7.

Further, when the "Eco-auto mode" is selected, the electronically controlled coupling 16 is put in stand-by in a completely released state. Therefore, it is possible to reduce the friction loss in the electronically controlled coupling 16 and improve the fuel economy.

Moreover, in the first embodiment, when the electronically controlled coupling 16 is in a completely released state, the flow port 25*e* is closed by the on-off valve 25*d*, and the lubricating oil is stored in the oil chamber 25*c*. For this reason, it is possible to reduce the lubrication oil amount between the input side clutch plate 16*a* and the output side clutch plate 16*c* of the electronically controlled coupling 16. As a result, in the electronically controlled coupling 16, it is possible to suppress the occurrence of oil drag torque and to further improve the fuel efficiency by reducing the friction loss.

Also, in this stand-by two-wheel drive mode, when the drive slip in the left and right front wheels 6 and 7 occurs, only the electronically controlled coupling 16 is connected to distribute the driving force to the left and right rear wheels 19 and 20, and a difference rotation control will be carried out to suppress the drive slip. Then, when the drive slip converges, the electronically controlled coupling 16 will be released completely.

Thus, in the standby two-wheel drive mode, when the drive slip occurs, it is possible to switch promptly from 2WD traveling to 4WD traveling by frictionally connecting the electronically controlled coupling 16 only, i.e., without waiting for meshing of the dog clutch 8. Therefore, it is possible to allocate the driving force to the left and right rear wheels 19 and 20 quickly and in good response so that the drive slip may converge in a short time. In particular, in the stand-by two-wheel drive mode, although the system is set in a region in which the drive slip is highly likely to increase rapidly, it is possible for the drive slip to converge quickly.

Further, in the case of "Sport-auto mode" being selected, control proceeds from step S401 to step S409. Here, since the dog clutch 8 and the electronically controlled coupling 16 are both connected already, control proceeds from step S409 through step S411 to step S414, to release the electronically controlled coupling 16. Then, control proceeds to step S415, and the dog clutch is placed in a connected state while the electronically controlled coupling 16 is place in a released state immediately before connection. Accordingly, upon occurrence of the drive slip, when the movable cam piston of the electronically controlled coupling 16 strokes even slightly in the clutch connecting side, the driving force transmission takes place immediately to thereby allow to shift 2WD traveling to 4WD traveling quickly. This makes it possible to further distribute the driving force to the left and right rear wheels 19 and 20 in good response so as to meet the four-wheel drive performance requirements.

Further, in the present first embodiment, when the electronically controlled coupling 16 is in a released state immediately before connecting, the flow port 25*e* is opened by the on/off valve 25*d*, and the lubricating oil flows into the clutch chamber 25*b*. Therefore, it is possible to suppress the heat generation of the electronically controlled coupling 16 to thereby protect the clutch.

Then, a case is assumed where the accelerator pedal is released in the preparation of vehicle stop. At this time, since the accelerator opening becomes zero by releasing a foot from the accelerator pedal, the operating point on the drive mode switching map is moved from the position of the point γ to the position of point δ. However, since the vehicle speed is not reduced immediately, although the accelerator opening is less than the set opening ACC0, but the vehicle speed maintains the high vehicle speed range greater than the region dividing line A. In other words, the operating point is moved to the disconnect two-wheel drive mode (differential rotation control region (Disconnect)). Thus, when the operating point crosses the region dividing line B, a switching request from the standby two-wheel drive mode to the disconnect two-wheel drive mode is outputted.

Thus, in the flowchart shown in FIG. 5, control proceeds from step S1 via step S2 to step S3, and the disconnect drive mode process is performed. Here, since the switching request from the standby two-wheel drive mode to the disconnect two-wheel drive mode is output, only the dog clutch 8 is connected. Therefore, in the flowchart shown in FIG. 6, control proceeds from step S301 via step S303 and step S304 to step S305, and, the dog clutch 8 is released. Thus, since both the dog clutch 8 and the electronically controlled coupling 16 are set in a released state, 2WD traveling of the front wheel drive is carried out by transmitting the driving force only to the left and right front wheels 6, 7. At this time, because the electronically controlled coupling 16 is already released, it is sufficient to release only the dog clutch 8 for a rapid mode transition. Further, in the disconnect two-wheel drive mode, when the drive slip occurs in the left and right front wheels 6 and 7, the electronically controlled coupling 16 is frictionally connected, and the dog clutch 8 is put in a meshed connection after rotational synchronization so that a differential rotation control will be performed to suppress the drive slip by allocating the driving force to the left and right rear wheels. Then, when the drive slip converges, the dog clutch 8 and the electronically controlled coupling 16 will be set in a released state again.

In the disconnect two-wheel drive mode, since the dog clutch 8 is disengaged, the rotation of drive system downstream of the dog clutch 8 (rotation such as the propeller shaft 12) is stopped. That is, it is possible to separate the entire rear-wheel drive system from the front wheel drive system, so that it is possible to suppress friction loss and oil agitation loss to thereby improve fuel consumption.

Then, when the vehicle speed is reduced, and the vehicle speed is below the set vehicle speed VSP0, the operating point crosses the region dividing line A, and moves to the Connect four-wheel drive mode (driving force distribution area (Connect)). Thus, a switching request from the disconnect two-wheel drive mode to the Connect four-wheel drive mode is outputted.

Thus, in the flowchart shown in FIG. 5, control proceeds from step S1 via step S2 to step S5 again, and the Connect four-wheel drive mode process is performed. At this time, since the dog clutch 8 and the electronically controlled coupling 16 are both released, in the flowchart shown in FIG. 8, control proceeds from step S501 through step S502, step S503, step S504, step S505 to step S506, and the electronically controlled the coupling 16 is first frictionally connected and the dog clutch 8 is meshed for 4WD traveling.

Note that in the case of running on a downward slope at the low vehicle speed with a low accelerator opening, even with the accelerator opening left small, the vehicle speed increases. In other words, while the accelerator opening is below the set opening ACC0, the operating point is moved to a high vehicle speed region larger than the region dividing line A. For this reason, the operating point on the drive mode switching map moves from the point α1 in the Connect four-wheel drive mode (driving force distribution area (Connect)), to a point β1 in the disconnect two-wheel drive mode (differential rotation control region (Disconnect)), and a switching request from the Connect four-wheel drive mode to the disconnect two-wheel drive mode is outputted.

At this time, since the dog clutch 8 and the electronically controlled coupling 16 are both connected, in the flowchart shown in FIG. 6, control proceeds from step S301 through step S302, step S303, and step S304 to step S305, and the electronically controlled coupling 16 is released with the dog clutch being subsequently released so that both the dog clutch 8 and the electronically controlled coupling 16 are in a released state.

Further, when traveling an uphill at high speed with large accelerator opening, the vehicle speed decreases with a constant accelerator position. In other words, while the accelerator opening is held above the set opening ACC0, the operating point is moved to a low vehicle speed region lower than the region dividing line A. Thus, the operating point on the drive mode switching map is moves from the point α2 in the standby two-wheel drive mode (differential rotation control region (Stand-by)) to β2 in the Connect four-wheel drive mode (driving force distribution region (Connect)), so that a switching request from the standby two-wheel drive mode to the Connect four-wheel drive mode is outputted.

In this case, because the dog clutch 8 is already is connected, in the flow chart shown in FIG. 8, control proceeds from step S501 via steps S502 and S503 to step S506, and only the electronically controlled coupling 16 is connected to render both the dog clutch 8 and the electronically controlled coupling 16 in the engaged or connected state. Thus, it is possible to switch quickly from 2WD traveling to the 4WD traveling without waiting for meshing of the dog clutch 8.

Furthermore, in the case of increased depression of the accelerator pedal is performed during traveling at high speed with a low accelerator opening, the accelerator opening is increased while maintaining high speed. In other words, while the vehicle speed is maintained at a high vehicle speed range larger than the region dividing line A, the accelerator opening exceeds the region dividing line B. Thus, the operating point on the drive mode switching map is moved from the point α3 in the disconnect two-wheel drive mode (differential rotation control region (Disconnect)) to β3 in the standby two-wheel drive mode (differential rotation control region (Stand-by)) so that a switching request from the disconnect two-wheel drive mode to the standby two-wheel drive mode is outputted.

At this time, since the dog clutch 8 and the electronically controlled coupling 16 have been both released, when, for example, the Eco-auto mode is selected, in the flowchart shown in FIG. 7, control proceeds from step S401 through step S402, step S403, step S404, step S405, step S406, and step S407 to step S408. In other words, in order to rotate the dog clutch 8 in synchronization, the electronically controlled coupling 16 is temporarily connected. After the rotational synchronization, when the dog clutch 8 is connected, by releasing the electronically controlled coupling 16, the dog clutch 8 is placed in a connected state while the electronically controlled the coupling 16 is brought to a released state.

Timing Setting Operation of Drive Mode Switch

In the clutch control device in the first embodiment, when "Auto mode" is selected, based on the vehicle speed (VSP), the accelerator opening representing the required driving force of the driver (ACC), and the drive mode switching map shown in FIG. 3, switching takes place among three modes of the disconnect two-wheel drive mode (Disconnect), standby two-wheel drive mode (Stand-by), and connect four-wheel drive mode (Connect), the three drive mode.

At this time, as shown in FIG. 4, the transition speed when switching from the standby two-wheel drive mode (2WD traveling (Standby)) or from the Connect four-wheel drive mode (4WD traveling (Connect)) to the disconnect two-wheel drive mode (2WD traveling (Disconnect)) is set relatively slower. Also, when switching from disconnect two-wheel drive mode (2WD traveling (Disconnect)) to the standby two-wheel drive mode (2WD traveling (Standby)) or from disconnect two-wheel drive mode (2WD traveling (Disconnect)) to the connect four-wheel drive mode (4WD traveling (Connect)), and further mutually between the stand-by two-wheel drive mode (2WD traveling (Standby)) and the connect four-wheel drive mode (4WD traveling (Connect)), the transition speed is set relatively faster.

Therefore, when releasing the dog clutch 8 from meshing, or when connecting the dog clutch 8 from releasing, a mode transition takes place in a time delay from the output of the switching request. Accordingly, when the operating point on the drive mode switching map is not stable, it is possible to prevent connecting/releasing of the dog clutch 8 from occurring so that the occurrence of control hunting can be prevented.

Furthermore, in the first embodiment, the dog clutch 8 is disposed upstream of the bevel gear 9 provided in the drive branch position to the left and right front wheels 6 and 7 and the output pinion 10. Further, the electronically controlled coupling 16 is configured to be disposed in the left rear wheel drive shaft 17 after the drive torque passes from the bevel gear 9 and the output pinion 10 through the rear wheel output shaft 11, the propeller shaft 12, the drive pinion 13, the ring gear 14, and the rear differential 15. With this configuration, when the "disconnect two-wheel drive mode" is selected, the bevel gear 9, the output pinion 10, the rear wheel output shaft 11, the propeller shaft 12, the drive pinion 13, ring gear 14, and the differential case of the rear differential 15 is stopped to rotate. Therefore, when the "disconnect two-wheel drive mode" is selected, the rotation of the drive system extending from the dog clutch 8 to the to the electronically controlled coupling 16 is rendered to be stopped so that such as friction loss and oil agitation loss is effectively suppressed to thereby achieve improved fuel efficiency.

Now, a description will be given of effects. In a clutch control device for a four-wheel drive vehicle in the first embodiment, it is possible to obtain the following effects.

(1) In a clutch control device for a four-wheel drive vehicle in which one of the left and right front wheels and the left and right rear wheels are set as main drive wheels that are connected to a driving source (transverse engine 1), while the others are set as auxiliary drive wheels that are connected to the driving source (transverse engine 1) via a clutch, the clutch control device performs selective connecting/releasing control of the clutch and comprises a drive mode switching unit (4WD control unit) configured to perform a switching control of the drive mode of the four-wheel drive vehicle in accordance with a vehicle state, the clutch including a meshing clutch (dog clutch 8) and a friction clutch (electronically controlled coupling 16) disposed separately in the driving force transmission system to the auxiliary drive wheels (left and rear wheels) in a transmission path on the drive branch side and in a transmission path on the auxiliary drive wheel side with a differential interposed. The meshing clutch (dog clutch 8) is configured to release the driving force transmission system (rear driving system) to the auxiliary drive wheels (left and right rear wheels 19 and 20) from the driving force transmission system (front driving system) to the main drive wheels (left and right front wheels 6 and 7). The friction clutch (electronically controlled coupling 16) allocates part of a driving force from the driving source (transverse engine 1) to the auxiliary drive wheels (left and right rear wheels 19 and 20) in response to the clutch connection capacity. The drive mode switching unit (4WD control unit 34) is configured to switch the drive mode among one of a disconnect two-wheel drive mode to release the meshing clutch (dog clutch 8) and the friction clutch (electronically control coupling 16), a connect four-wheel drive mode to connect the meshing clutch (dog clutch 8) and the friction clutch (electronically control coupling 16), and a stand-by two-wheel drive mode to connect the meshing clutch (dog clutch 8) and release the friction clutch (electronically control coupling 16) Thus, it is possible to perform switching from the two-wheel drive traveling (2WD traveling) to the 4-wheel drive traveling (4WD traveling) promptly.

(2) The drive mode switching unit (4WD control unit 34) is configured, when focusing on improving fuel consumption in the standby two-wheel drive mode, to bring the friction clutch (electronically controlled coupling 16) in a completely released state, and when focusing on the four-wheel drive performance in the stand-by two-wheel drive mode, to bring the friction clutch (electronically controlled coupling 16) in a released state immediately before connection. Thus, in addition to the effect of (1), during the stand-by two-wheel drive mode, when focusing on the fuel efficiency, it is possible to achieve further improvement in fuel consumption by preventing the occurrence of dragging torque in the friction clutch (electronically controlled coupling 16). Further, when focusing on the four-wheel drive performance, by striving to shorten the connecting time of the friction clutch (electronically controlled coupling 16) and switching more promptly to the 4-wheel drive traveling (4WD traveling) from the 2-wheel drive traveling (2WD traveling), it is possible to meet the demand for four-wheel drive performance.

(3) The friction clutch (electronically controlled coupling 16) is housed in a clutch case (coupling case 25). The clutch case (coupling case 25) has a clutch chamber 25b housing the friction clutch (electronically controlled coupling 16), an oil chamber 25c defined from the clutch chamber 25b through a partition wall 25a, an oil passage 25f communicating the clutch chamber 25b and the oil chamber 25c for flowing lubricating oil from the clutch chamber 25b into the oil chamber 25c due to a centrifugal force generated in response to rotation of the friction clutch (electronically controlled coupling 16), and an on-off valve 25d disposed in the partition wall 25a. Further, the drive mode switching unit (4WD control unit 34) is configured, when emphasizing fuel efficiency in the stand-by two-wheel drive mode, to store the lubricating oil in the oil chamber 25c by closing the on-off valve 25d, while, when emphasizing the four-wheel drive performance in the stand-by two-wheel drive mode, to allow the lubricating oil to flow from the oil chamber 25c into the clutch chamber 25b by opening the on-off valve 25d. Thus, in addition to the effect of (2), when emphasizing fuel efficiency, it is possible to prevent the lubricating oil from generating agitation resistance to thereby achieve further fuel efficiency. Also, when emphasizing the four-wheel drive performance, it is possible to supply the lubricating oil to the friction clutch (electronically controlled coupling 16), to suppress the heat generation of the friction clutch (electronically controlled coupling 16), and to protect the clutch.

(4) The drive mode switching unit (4WD control unit 34) is further configured, when the vehicle speed is higher than a predetermined threshold vehicle speed and the required driving force of the driver is lower than a predetermined threshold required driving force, to switch the drive mode to the disconnect two-wheel drive mode, when the vehicle speed is higher than the predetermined threshold vehicle speed and the required driving force of the driver is higher than the predetermined threshold required driving force, to switch the drive mode to the standby two-wheel drive mode, and when the vehicle speed is lower than the threshold speed, switching the drive mode to the connect four-wheel drive mode. Thus, in addition to the effect of any one of the above (1) to (3), if there is a high possibility that the drive slip increases rapidly at a high vehicle speed with a high accelerator opening, the stand-by two-wheel drive mode is set to thereby allowing from the two-wheel traveling (2WD traveling) to the 4-wheel traveling (4WD traveling) to switch immediately. In addition, in the case of a high-speed with a low-accelerator opening with a low level of request for a four-wheel drive where a drive slip is increases slowly, the disconnect drive mode is set to thereby stop the drive system rotation on the downstream side from the meshing clutch (dog clutch 8). Thus, it is possible to suppress friction loss and oil agitation loss, to thereby achieve improved fuel efficiency.

(5) The drive mode switching unit (4WD control unit 34) is further configured to give priority to a switching transition speed to the stand-by two-wheel drive mode and switching transition speed to the connect four-wheel drive mode over a transition speed to the disconnect two-wheel drive mode. Thus, in addition to the effect of any one of the above (1) through (4), when the position of the operating point on the drive mode switching map is unstable, it is possible to prevent performing meshing/releasing control of the clutch (dog clutch 8) to thereby prevent the occurrence of control hunting.

(6) The dog clutch (dog clutch 8) is disposed in the upstream position of a transfer mechanism (bevel gear 9, output pinion 10) provided in a drive branch position to the auxiliary drive wheels (left and right rear wheels 19, 20). The friction clutch (electronically controlled coupling 16) is disposed in a position of the drive shaft (left rear drive shaft 17) leading to the auxiliary drive wheel (rear left wheel 19) from the transfer mechanism (bevel gear 9, output pinion 10) via a propeller shaft 12 and a differential (rear differential 15). Thus, in addition to the effect of any one of the above (1) through (5), in front-wheel drive-based a four-wheel drive vehicle, when the "disconnect two-wheel drive mode" is selected, the friction loss and oil agitation loss and the like are effectively suppressed to achieve improved fuel efficiency.

The Second Embodiment

The second embodiment is an example in which the clutch control device is applied to a four-wheel drive vehicle of the rear wheel drive base and the arrangement of the meshing clutch and the friction clutch with a differential interposed is in a reversed relationship from the first embodiment.

Figure 10:
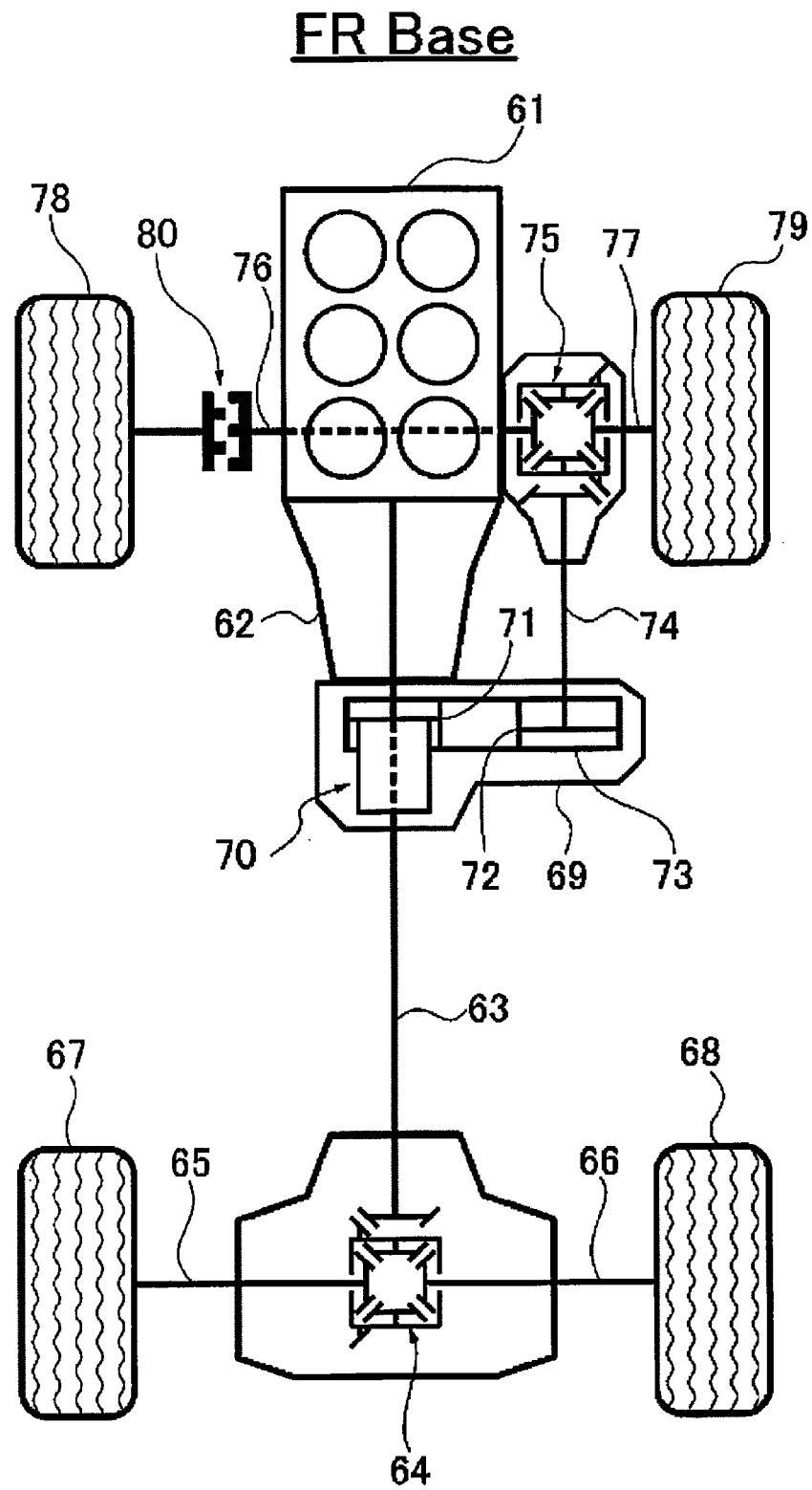
FIG. 10 is a driving system configuration diagram illustrating a driving system configuration of a four-wheel drive vehicle with a rear-wheel drive base to which a clutch control device is applied in accordance with a second illustrated embodiment.

FIG. 10 schematically illustrates a driving system of a four-wheel drive vehicle with a rear-wheel drive base to which a clutch control device is applied in accordance with a second embodiment. Below, with reference to FIG. 10, a description is given of the drive system configuration of the four-wheel drive vehicle.

As shown in FIG. 10, the rear wheel drive system of the four wheel drive vehicle includes a longitudinal engine 61 (driving source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel). That is, the driving force passing through the longitudinal engine 61 and the transmission 62 is transmitted to the left and right rear wheels drive shafts 65 and 66 through the rear propeller shaft 63 and the rear differential 64, to drive the left and right rear wheels 67 and 68 at all times while permitting a rotation difference.

As shown in FIG. 10, in the front wheel drive system of the four-wheel drive vehicle, a transfer mechanism is configured such that, in the transfer case 69, an electronically controlled coupling 70 (friction clutch), an input sprocket 71, an output sprocket 72, a chain 73 are provided. In addition, a front propeller shaft 74 which is connected to the output sprocket 72, a front differential 75, a left front wheel drive shaft 76, a right front wheel drive shaft 77, a left front wheel 78 (auxiliary drive wheel), and a right front wheel 79 (auxiliary drive wheel). The electronically controlled coupling 70 is disposed inside the transfer case 69 and positioned upstream of the input sprocket 71 (main drive system side position).

The dog clutch 80 (meshing clutch) is disposed in the intermediate position of the left front wheel drive shaft 76 that connects the front differential 75 and the left front wheel 78. That is, such a two-wheel drive mode driving system is configured that is capable of selecting a two-wheel drive mode (=disconnect two-wheel drive mode) for releasing both the electronically controlled coupling 70 and the dog clutch 80. By releasing the electronically controlled coupling 70 and the dog clutch 80, the drive system downstream of the electronically controlled coupling 70 (rotation, such as the front propeller shaft 74) is stopped to rotate is stopped to suppress friction loss and oil agitation loss, etc. suppressed, so that fuel efficiency is improved.

Now, a description is given of the synchronous operation of the dog clutch 80. In the first embodiment, such a configuration is adopted in which, in the driving force transmission system to the left and right rear wheels 19 and 20 representing auxiliary drive wheels, with a rear differential 15 interposed, in the driving force transmission path on the driving force branch side, a dog clutch 8 is disposed, while, in a transmission path on the side of the auxiliary drive wheel, an electronically controlled disposed separately from each other. Therefore, at the time of a meshing request for the dog clutch 8 in the released state, when the meshing control of the electronically controlled coupling 16 is done, the left side gear of the rear differential 15 is restricted by the rotation speed of the left rear wheel 19. Therefore, of the three rotary members (left and right side gears and the differential case) of the rear differential 15, due to the rotation speed of the left and right side gears being restricted, the rotation speed of the propeller shaft 12 which is connected to the differential case reaches the average of left and right rear wheels 19 (driven wheel rotation speed). As a result, when the left and right front wheels 6 and 7 are in the non-slip state, the clutch differential rotation $\Delta N$ of the dog clutch 8 is zero ($\Delta N=0$). However, when the left and right front wheels 6 and 7 are in a slip state, the clutch differential rotation $\Delta N$, which are on decrease with the passage of time, become critical when reaching a certain differential rotation. Subsequently, the clutch rotation difference $\Delta N$ changes to increase, along the passage of time, the clutch differential rotation $\Delta N$ will increase.

In contrast, in the second embodiment, in the driving force transmission system to the left and right front wheels 78 and 79 representing auxiliary drive wheels, it is configured such that, with the front differential 75 interposed, an electronically controlled coupling 70 is disposed in the transmission path on the drive branch side, while a dog clutch 80 is disposed separately in the transmission path on the side of auxiliary drive side, respectively. Therefore, at the time of a meshing request for the dog clutch 80 in the released state, when the meshing control of the electronically controlled coupling 70 is done, the differential case of the front differential 75 is restricted by the rotation speed of the rear propeller shaft 63. Therefore, of the three rotary members of the front differential 75 (left and right side gears and the differential case), due to the rotation speed of the differential case and right side gear (right front wheel 79) being constrained, the rotation speed of the left side gear will be determined by two rotational speeds. As a result, when the left and right rear wheels 67 and 68 are in the non-slip state, the clutch differential rotation ΔN of the dog clutch 80 is zero (ΔN=0). However, when the left and right rear wheels 67 and 68 are in a slip condition, the clutch differential rotation ΔN decreases along with the passage of time, and would be reversed after crossing a point of ΔN being zero. Subsequently, the clutch differential rotation ΔN will increase in the inverted state. Since other operations are the same as in the first embodiment, the description thereof is omitted.

Now, a description will be given of effects. In the clutch control device for a four-wheel drive vehicle in the second embodiment, the following effect may be obtained.

(7) The friction clutch (electronically controlled coupling 70) is disposed in the upstream position of a transfer mechanism (input side sprocket 71, output side sprocket 72, and a chain 73) provided at a drive branch position leading to the auxiliary drive wheels (left and right front wheels 78 and 79). The meshing clutch (dog clutch 80) is disposed in a drive shaft (left front wheel drive shaft 76) leading to the auxiliary drive wheel (left front wheel 78) from the transfer mechanism via a propeller shaft (front propeller shaft 74) and a differential (front differential 75). Therefore, in addition to the effects of (1) to (5), in a four-wheel drive vehicle of the rear wheel drive base, when the "disconnect two-wheel drive mode" is selected, friction loss, oil agitation loss and the like may be effectively suppressed. Thus, it is possible to achieve improved fuel efficiency.

Although the clutch control device for a four-wheel drive vehicle according to the present invention has been described based on the first and second embodiments. The specific configuration is not limited to these embodiments. Rather, changes in design, additions, and the like are acceptable without departing from the gist of the invention according to each claim, For example, in the first embodiment, the dog clutch 8 is disposed in a drive branch position to the left and right rear wheels 19 and 20 representing auxiliary drive wheels, whilst the electronically controlled coupling 16 is disposed in the left rear wheel drive shaft 17 downstream of the bevel gear 9, propeller shaft 12, and the rear differential 15. However, the configuration is not limited thereto. For example, the dog clutch 8 may be arranged between the bevel gear 9 and the propeller shaft 12. Further, the electronically controlled coupling 16 may be disposed at the position in the right rear wheel drive shaft 18. Moreover, the electronically controlled coupling may be disposed between the propeller shaft 12 and the rear differential 15.

Furthermore, the dog clutch 8 may be constituted by a meshing clutch which is subject to releasing/connecting by a shift fork driven by hydraulic pressure. In addition, the electronically controlled coupling 16 may be constituted by a hydraulic friction clutch to release/connect a multi-plate clutch by hydraulic pressure.

In the first embodiment, the clutch control device in a four-wheel drive vehicle (4WD engine vehicle) is applied to a four-wheel drive vehicle of front wheel drive equipped with an engine as driving source. Also, in the second embodiment, the clutch control device in a four-wheel drive vehicle (4WD engine vehicle) is applied to a four-wheel drive vehicle of rear wheel drive in which main driving source are left and right rear wheels. However, the invention may be applied to a four-wheel drive vehicle of rear wheel drive base in which the relative arrangement of the meshing clutch and the friction clutch matches the relationship described in the first embodiment. Further, the invention may be applied to a four-wheel drive vehicle of front wheel drive base in which the relative arrangement of the meshing clutch and the friction clutch matches the relationship described in the second embodiment. Besides, the invention may be applied, in addition to a 4WD engine vehicle, to a 4WD hybrid vehicle having a motor and an engine as driving source, or a 4WD electric vehicle having a motor only as driving source.

The invention claimed is:

1. A vehicle clutch control device for a four-wheel drive vehicle having a pair of main drive wheels connected to a driving source and a pair of auxiliary drive wheels selectively connected to the driving source, the clutch control device comprising:
    a drive mode switching unit configured to perform a switching control of a drive mode of the vehicle based on a vehicle state;
    a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch; and
    a friction clutch operatively disposed in the transmission path between the main drive wheels and the auxiliary drive wheels to allocate a portion of the drive force from the driving source to the auxiliary drive wheels in accordance with a clutch engagement capacity of the friction clutch,
    the drive mode switching unit being configured to switch the drive mode of the vehicle between a disconnect two-wheel drive mode, a connect four-wheel drive mode and a stand-by two wheel drive mode, the dog clutch and the friction clutch being released in the disconnect two-wheel drive mode, the dog clutch and the friction clutch being engaged in the connect four-wheel drive mode, the dog clutch being engaged and the friction clutch being released in the stand-by two wheel drive mode,
    the drive mode switching unit being further configured to switch to the stand-by two-wheel drive mode and to the connect four-wheel drive mode with less delay than switching to the disconnect two-wheel drive mode.

2. The vehicle clutch control device according to claim 1, wherein
    the drive mode switching unit is configured to bring the friction clutch in a completely released state in the stand-by two-wheel drive mode to enhance fuel efficiency, and the drive mode switching unit is further configured to bring the friction clutch in a released state immediately before connection to enhance four-wheel drive performance while in the stand-by two-wheel drive mode.

3. The vehicle clutch control device according to claim 2, wherein
the drive mode switching unit is further configured to switch the drive mode of the vehicle to the disconnect two-wheel drive mode in a condition during which a vehicle speed is higher than a predetermined threshold vehicle speed and a required driving force is lower than a predetermined threshold driving force,
the drive mode switching unit is further configured to switch the drive mode of the vehicle to the stand-by two-wheel drive mode in a condition during which the vehicle speed is higher than the predetermined threshold vehicle speed and the required driving force is higher than the predetermined threshold driving force, and
the drive mode switching unit being is configured to switch the drive mode of the vehicle to the connect four-wheel drive mode in a condition in which the vehicle speed is lower than the predetermined threshold vehicle speed.

4. The vehicle clutch control device according to claim 3, wherein
the predetermined threshold vehicle speed increases as the required driving force increases.

5. The vehicle clutch control device according to claim 2, wherein
the drive mode switching unit is further configured to give priority to a switching transition speed for switching to the stand-by two-wheel drive mode and a switching transition speed for switching to the connect four-wheel drive mode over a switching transition speed for switching to the disconnect two-wheel drive mode.

6. The vehicle clutch control device according to claim 2, wherein
the dog clutch is disposed upstream of a transfer mechanism provided in a drive branch to the auxiliary drive wheels, and
the friction clutch is in a drive shaft leading to the auxiliary drive wheel from the transfer mechanism that is connected to a propeller shaft and a differential.

7. The vehicle clutch control device according to claim 2, wherein
the friction clutch is disposed upstream of a transfer mechanism provided at a drive branch leading to the auxiliary drive wheels, and
the dog clutch is disposed in a drive shaft leading to the auxiliary drive wheel from the transfer mechanism that is connected to a propeller shaft and a differential.

8. The vehicle clutch control device according to claim 1, wherein
the dog clutch is disposed upstream of a transfer mechanism that is provided in a drive branch to the auxiliary drive wheels, and
the friction clutch is in a drive shaft leading to the auxiliary drive wheel from the transfer mechanism that is connected to a propeller shaft and a differential.

9. The vehicle clutch control device according to claim 1, wherein
the friction clutch is disposed upstream of a transfer mechanism provided at a drive branch leading to the auxiliary drive wheels, and
the dog clutch is disposed in a drive shaft leading to the auxiliary drive wheel from the transfer mechanism that is connected to a propeller shaft and a differential.

10. A vehicle clutch control device for a four-wheel drive vehicle having a pair of main drive wheels connected to a driving source and a pair of auxiliary drive wheels selectively connected to the driving source, the clutch control device comprising:
a drive mode switching unit configured to perform a switching control of a drive mode of the vehicle based on a vehicle state;
a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch; and
a friction clutch operatively disposed in the transmission path between the main drive wheels and the auxiliary drive wheels to allocate a portion of the drive force from the driving source to the auxiliary drive wheels in accordance with a clutch engagement capacity of the friction clutch, the friction clutch being housed in a clutch case having a clutch chamber and an oil chamber, the clutch chamber containing the friction clutch, the oil chamber being separated from the clutch chamber by a partition wall, the clutch case further including an oil passage through which lubricating oil from the clutch chamber flows into the oil chamber due to a centrifugal force generated in response to rotation of the friction clutch and by operation of an on-off valve disposed in the partition wall,
the drive mode switching unit being configured to switch the drive mode of the vehicle between a disconnect two-wheel drive mode, a connect four-wheel drive mode and a stand-by two wheel drive mode, the dog clutch and the friction clutch being released in the disconnect two-wheel drive mode, the dog clutch and the friction clutch being engaged in the connect four-wheel drive mode, the dog clutch being engaged and the friction clutch being released in the stand-by two wheel drive mode,
the drive mode switching unit is configured to bring the friction clutch in a completely released state in the stand-by two-wheel drive mode to enhance fuel efficiency, and
the drive mode switching unit is further configured to bring the friction clutch in a released state immediately before connection to enhance four-wheel drive performance while in the stand-by two-wheel drive mode,
the drive mode switching unit being further configured to close the on-off valve so that lubricating oil is stored in the oil chamber to enhance fuel efficiency in the stand-by two-wheel drive mode, and
the drive mode switching unit being further configured to open the on-off valve so that lubricating oil flows from the oil chamber into the clutch chamber to enhance four-wheel drive performance in the stand-by two-wheel drive mode.

11. The vehicle clutch control device according to claim 10, wherein
the drive mode switching unit is further configured to switch the drive mode of the vehicle to the disconnect two-wheel drive mode in a condition during which a vehicle speed is higher than a predetermined threshold vehicle speed and a required driving force is lower than a predetermined threshold driving force, the drive mode switching unit is further configured to switch the drive mode of the vehicle to the stand-by two-wheel drive mode in a condition during which the vehicle speed is higher than the predetermined threshold vehicle speed and the required driving force is higher than the predetermined threshold driving force, and the drive mode switching unit is further configured to switch the drive mode of the vehicle to the connect four-wheel drive mode in a condition in which the vehicle speed is lower than the predetermined threshold vehicle speed.

12. The vehicle clutch control device according to claim 10, wherein the drive mode switching unit is further configured to give priority to a switching transition speed for switching to the stand-by two-wheel drive mode and a switching transition speed for switching to the connect four-wheel drive mode over a switching transition speed for switching to the disconnect two-wheel drive mode.

13. The vehicle clutch control device according to claim 10, wherein the dog clutch is disposed upstream of a transfer mechanism provided in a drive branch to the auxiliary drive wheels, and the friction clutch is in a drive shaft leading to the auxiliary drive wheel from the transfer mechanism that is connected to a propeller shaft and a differential.

14. The vehicle clutch control device according to claim 10, wherein the friction clutch is disposed upstream of a transfer mechanism provided at a drive branch leading to the auxiliary drive wheels, and the dog clutch is disposed in a drive shaft leading to the auxiliary drive wheel from the transfer mechanism that is connected to a propeller shaft and a differential.

15. A vehicle clutch control device for a four-wheel drive vehicle having a pair of main drive wheels connected to a driving source and a pair of-auxiliary drive wheels selectively connected to the driving source, the clutch control device comprising:

a drive mode switching unit configured to perform a switching control of a drive mode of the vehicle based on a vehicle state;

a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch; and a friction clutch operatively disposed in the transmission path between the main drive wheels and the auxiliary drive wheels to allocate a portion of the drive force from the driving source to the auxiliary drive wheels in accordance with a clutch engagement capacity of the friction clutch, the drive mode switching unit being configured to switch the drive mode of the vehicle between a disconnect two-wheel drive mode, a connect four-wheel drive mode and a stand-by two wheel drive mode, the dog clutch and the friction clutch being released in the disconnect two-wheel drive mode, the dog clutch and the friction clutch being engaged in the connect four-wheel drive mode, the dog clutch being engaged and the friction clutch being released in the stand-by two wheel drive mode, the drive mode switching unit being further configured to switch the drive mode of the vehicle to the disconnect two-wheel drive mode in a condition during which a vehicle speed is higher than a predetermined threshold vehicle speed that is greater than zero and a required driving force is lower than a predetermined threshold driving force, the drive mode switching unit is further configured to switch the drive mode of the vehicle to the stand-by two-wheel drive mode in a condition during which the vehicle speed is higher than the predetermined threshold vehicle speed and the required driving force is higher than the predetermined threshold driving force, and the drive mode switching unit is further configured to switch the drive mode of the vehicle to the connect four-wheel drive mode in a condition in which the vehicle speed is lower than the predetermined threshold vehicle speed.

16. The vehicle clutch control device according claim 15, wherein the predetermined threshold vehicle speed increases as the required driving force increases.

17. The vehicle clutch control device according to claim 15, wherein the drive mode switching unit is further configured to give priority to a switching transition speed for switching to the stand-by two-wheel drive mode and a switching transition speed for switching to the connect four-wheel drive mode over a switching transition speed for switching to the disconnect two-wheel drive mode.

18. The vehicle clutch control device according to claim 15, wherein the dog clutch is disposed upstream of a transfer mechanism provided in a drive branch to the auxiliary drive wheels, and the friction clutch is in a drive shaft leading to the auxiliary drive wheel from the transfer mechanism that is connected to a propeller shaft and a differential.

19. The vehicle clutch control device according to claim 15, wherein the friction clutch is disposed upstream of a transfer mechanism provided at a drive branch leading to the auxiliary drive wheels, and the dog clutch is disposed in a drive shaft leading to the auxiliary drive wheel from the transfer mechanism that is connected to a propeller shaft and a differential.

* * * * *